United States Patent
Nakamura et al.

(10) Patent No.: US 6,384,831 B1
(45) Date of Patent: May 7, 2002

(54) GRAPHIC PROCESSOR AND DATA PROCESSING SYSTEM

(75) Inventors: Atsushi Nakamura, Kodaira; Yasuhiro Nakatsuka, Toyooka Tokai-mura; Kazushige Yamagishi, Higashimurayama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/213,172

(22) Filed: Dec. 17, 1998

(30) Foreign Application Priority Data

Dec. 22, 1997 (JP) .............................. 9-352543

(51) Int. Cl.⁷ .............................. G06F 15/16
(52) U.S. Cl. ................. 345/503; 345/545; 345/531; 345/639; 345/620; 345/660
(58) Field of Search .................. 345/149, 150, 345/152, 153, 501, 503, 519, 522, 547, 561, 130, 132, 136, 138, 545, 531, 620, 639, 660, 671, 600

(56) References Cited

U.S. PATENT DOCUMENTS

| | | | |
|---|---|---|---|
| 5,657,047 A | * 8/1997 | Tarolli | 345/127 |
| 5,764,240 A | * 6/1998 | Herz | 345/508 |
| 5,867,180 A | * 2/1999 | Katayama et al. | 345/512 |
| 5,936,621 A | * 8/1999 | Medin et al. | 345/213 |
| 5,943,036 A | * 8/1999 | Tanaka | 345/136 |
| 5,963,192 A | * 10/1999 | Wong et al. | 345/150 |
| 6,014,125 A | * 1/2000 | Herbert | 345/127 |
| 6,034,733 A | * 3/2000 | Balram et al. | 348/448 |
| 6,061,094 A | * 5/2000 | Maietta | 348/446 |
| 6,130,660 A | * 10/2000 | Imsand | 345/132 |
| 6,130,723 A | * 10/2000 | Medin | 348/607 |
| 6,191,772 B1 | * 2/2001 | Mical et al. | 345/132 |

FOREIGN PATENT DOCUMENTS

| | | |
|---|---|---|
| JP | 646299 | 2/1994 |
| JP | 683299 | 3/1994 |
| JP | 7274086 | 10/1995 |
| JP | 8317311 | 11/1996 |

* cited by examiner

*Primary Examiner*—Ulka J. Chauhan
(74) *Attorney, Agent, or Firm*—Antonelli, Terry, Stout & Kraus, LLP

(57) ABSTRACT

In a graphic processor, a rendering control circuit carries out weighted averaging on pieces of pixel data of source image information arranged to form a pixel-data matrix corresponding to a pixel matrix with columns of the pixel-data matrix being oriented perpendicularly to a scanning direction in order to compute a weighted average of pieces of pixel data on rows of the pixel-data matrix adjacent to each other and on a column of the pixel-data matrix perpendicular to the scanning direction in so-called blend processing. It is thus possible to eliminate a difference in image information between adjacent scanning lines, which is big in some cases. In this case, the rendering control circuit reads out pieces of pixel data from the pixel-data matrix sequentially in a direction perpendicular to the scanning direction and computes a weighted average of the pieces of data. It is therefore unnecessary to newly install a storage means, such as a line buffer, in a display control circuit and, particularly, in the rendering control circuit. Thus, even when image data subjected to blend processing is displayed by adopting an interlace scanning technique, undesired flickering is not generated.

8 Claims, 24 Drawing Sheets

FIG. 5A

RENDERING COMMAND

| KINDS | COMMAND | FUNCTION |
|---|---|---|
| 4 APEX FACE DRAWING | POLYGON 4A | PERFORMS ANY FOUR-VERTEX DRAWING WHILE REFERENCING A MULTI-BIT/PIXEL SOURCE |
| | POLYGON 4B | PERFORMS ANY FOUR-VERTEX DRAWING WHILE REFERENCING A ONE-BIT/PIXEL SOURCE |
| | POLYGON 4C | PERFORMS ANY FOUR-VERTEX DRAWING WITH A MONOCHROME SPECIFICATION |
| | FRECTQ (BLEND COMMAND) | PERFORMS ANY FOUR-VERTEX DRAWING WITH A FILTER (BLEND PROCESSING) WHILE REFERENCING A MULTI-BIT/PIXEL SOURCE |
| LINE DRAWING | LINE | DRAWS SEVERAL POLYGONAL LINES (ABSOLUTE COORDINATE SPECIFICATION) |
| | RLINE | DRAWS SEVERAL POLYGONAL LINES (RELATIVE COORDINATE SPECIFICATION) |
| | PLINE | DRAWS A POLYGONAL LINE AT RENDERING COORDINATES WHILE REFERENCING A ONE- BIT/PIXEL SOURCE (ABSOLUTE COORDINATE SPECIFICATION) |
| | RPLINE | DRAWS A POLYGONAL LINE AT RENDERING COORDINATES WHILE REFERENCING A ONE- BIT/PIXEL SOURCE (RELATIVE COORDINATE SPECIFICATION) |
| WORK FACE DRAWING | FTRAP | PAINTS A TRAPEZOID AT WORK COORDINATE WITH EOR OF 1 AND A ONE- BIT/PIXEL DATA THAT IS READ FROM WORK COORDINATE (ABSOLUTE COORDINATE SPECIFICATION) |
| | RFTRAP | PAINTS A TRAPEZOID AT WORK COORDINATE WITH EOR OF 1 AND A ONE- BIT/PIXEL DATA THAT IS READ FROM WORK COORDINATE (RELATIVE COORDINATE SPECIFICATION) |
| | CLRW | ZERO-CLEARS THE AREA SPECIFIED BY UPPER-LEFT COORDINATES AND LOWER-RIGHT COORDINATES IN THE WORK COORDINATE SYSTEM |

FIG. 5B

RENDERING COMMAND

| KINDS | COMMAND | FUNCTION |
|---|---|---|
| WORK LINE DRAWING | LINEW | DRAWS SEVERAL POLYGONAL LINES AT WORK COORDINATE IN ONE-BIT/PIXEL (0 OR 1) (ABSOLUTE COORDINATE SPECIFICATION) |
| | RLINEW | DRAWS SEVERAL POLYGONAL LINES AT WORK COORDINATE IN ONE-BIT/PIXEL (0 OR 1) (RELATIVE COORDINATE SPECIFICATION) |
| PARAMETER REGISTER SETTING | MOVE | SETS A CURRENT POINTER (ABSOLUTE COORDINATE SPECIFICATION) |
| | RMOVE | SETS A CURRENT POINTER (RELATIVE COORDINATE SPECIFICATION) |
| | LCOFS | SETS A LOCAL OFFSET VALUE (ABSOLUTE COORDINATE SPECIFICATION) |
| | RLCOFS | SETS A LOCAL OFFSET VALUE (RELATIVE COORDINATE SPECIFICATION) |
| | SCLIP | SETS RECTANGLE WITH DIAGONAL DESIGNATED BY ORIGIN AND SPECIFIED COORDINATE POINT AS CLIPPING AREA |
| | UCLIP | SETS RECTANGLE WITH DIAGONAL DESIGNATED BY TWO COORDINATE POINTS AS CLIPPING AREA |
| SEQUENCE CONTROL | JUMP | BRANCH |
| | GOSUB | BRANCH TO SUBROUTINE |
| | RET | RETURN TO SUBROUTINE |
| | NOP 3 | NO-OPERATION |
| RENDERING FINISH | TRAP | COMPLETION OF RENDERING |

FIG. 12

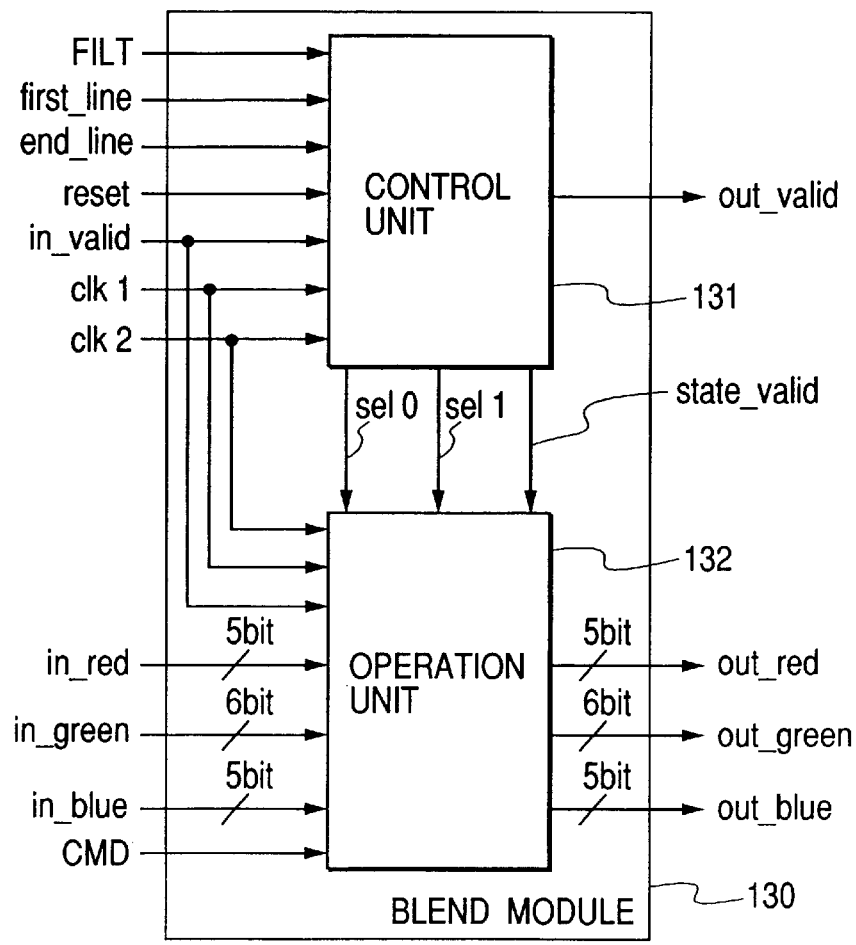

FILT=0 : 2 LINES WEIGHTED AVERAGE
FILT=1 : 3 LINES WEIGHTED AVERAGE
in_valid=0 : DATA IS INVALID
in_valid=1 : DATA IS VALID
CMD=0 : AT THE TIME OF COMMANDS OTHER THAN THE BLEND COMMAND
CMD=1 : AT THE TIME OF THE BLEND COMMAND
first_line=0 : AT THE TIME OF THE PIXEL OTHER THAN THE PIXEL ON THE FIRST LINE
first_line=1 : AT THE TIME OF THE PIXEL ON THE FIRST LINE
end_line=0 : AT THE TIME OF THE PIXEL OTHER THAN THE PIXEL ON THE END LINE
end_line=1 : AT THE TIME OF THE PIXEL ON THE END LINE

FIG. 15

| NO. | PRESENT STATE | NEXT STATE | TRANSITION CONDITION | sel 0 | sel 1 | state_valid | out_valid_0 |
|---|---|---|---|---|---|---|---|
| (1) | IDLE | S1 | (FILT=0) & (in_valid=1) & (first_line=1) | 0 | 1 | 1 | 1 |
| (2) | IDLE | T1 | (FILT=1) & (in_valid=1) & (first_line=1) | 0 | 1 | 1 | 1 |
| —  | IDLE | IDLE | (in_valid=0) | 0 | 0 | 0 | 0 |
| (3) | S1 | S2 | (in_valid=1) | 1 | 0 | 1 | 0 |
| —  | S1 | S1 | (in_valid=0) | 0 | 1 | 0 | 1 |
| (4) | T1 | S2 | (in_valid=1) | 1 | 1 | 1 | 0 |
| —  | T1 | T1 | (in_valid=0) | 0 | 1 | 0 | 1 |
| (5) | S2 | S2 | (in_valid=1) & (first_line !=1) & (end_line !=1) | 1 | 1 | 1 | 1 |
| (6) | S2 | S3 | (in_valid=1) & (end_line=1) | 1 | 1 | 1 | 0 |
| —  | S2 | S2 | (in_valid=0) | 1 | 1 | 0 | 1 |
| (7) | S3 | S1 | (FILT=0) & (in_valid=1) & (first_line=1) | 0 | 1 | 1 | 1 |
| (8) | S3 | T4 | (FILT=1) | 1 | 0 | 0 | 0 |
| (9) | S3 | IDLE | (in_valid=0) | 0 | 0 | 1 | 0 |
| (10) | T4 | T1 | (in_valid=1) & (first_line=1) | 0 | 1 | 1 | 1 |
| (11) | T4 | IDLE | (in_valid=0) | 0 | 0 | 0 | 0 |

CONTROL SIGNALS

3 LINES BLEND PROCESSING

2 LINES BLEND PROCESSING

| MEMORY USED BY THE RENDERING CONTROL UNIT | MEMORY USED BY THE DISPLAY CONTROL UNIT |
|---|---|
| DRAWING TO THE 1ST MEMORY | DISPLAYING THE 2ND MEMORY |
| DRAWING TO THE 2ND MEMORY | DISPLAYING THE 1ST MEMORY |
| DRAWING TO THE 1ST MEMORY | DISPLAYING THE 2ND MEMORY |
| ⋮ | ⋮ |

GRAPHIC PROCESSOR AND DATA PROCESSING SYSTEM

BACKGROUND OF THE INVENTION

In general, the present invention relates to a technology for preventing flickering, which might be generated in an operation based on interlaced scanning in display of image information which is to be displayed using a non-interlace scanning technique. More particularly, the present invention relates to an effective technology applied to a graphic processor for displaying computer data and for controlling rendering operations, as well as to a data processing system employing such a graphic processor.

A graphic processor employed in a computer apparatus, such as a personal computer, supplies image data generated by an application program to a display device, such as a video signal synchronized to the display timing of the display device. The computer apparatus controls the display of the image data by adopting a non-interlace scanning system. In the non-interlace scanning system, interlaced scanning of scanning fields is not carried out. Instead, all scanning lines are scanned in each vertical scanning period. Thus, a screen can be created in one vertical scanning period. As a result, a high display quality with little flickering can be obtained.

In an interlaced scanning system such as used in a conventional television, receiver on the other hand, scanning lines are divided into even and odd fields. In each vertical scanning period, only one of the even and odd fields are scanned. That is, interlaced scanning of every other scanning line is carried out. As a result, one complete screen is created in two vertical scanning periods.

As described above, in the non-interlace scanning system, all scanning lines are scanned in each vertical scanning period. Thus, the vertical-direction position of a scanned scanning line is the same for all screens. In the interlaced scanning system, however, a screen comprising only even fields and a screen comprising only odd fields are displayed in alternate vertical scanning periods. Thus, the vertical-direction position of a scanned scanning line appearing on the current screen is shifted from the immediately preceding and succeeding screens by one scanning-line pitch, respectively. As a result, if the difference in image information, such as the difference in brightness and color, between adjacent scanning lines in the interlaced scanning system is big, flickering is generated easily between a screen comprising only even fields and a screen comprising only odd fields.

In addition, there is also a need to display high-resolution image data produced by a personal computer on an ordinary television set by converting the data into a video signal of typically the NTSC (National Television System Committee) system. If such computer image data is displayed on a television set by merely changing the scanning system, however, a flickering will be generated which is not seen in the case of displaying the same data on a display device using the non-interlace scanning system. This is because, in comparison with a natural image produced by a television broadcasting system, a video camera or a VTR/VCR (video tape recorder/video cassette recorder), for example computer image data mainly comprises lines of characters and shade patterns, exhibiting a big difference in image information between any two adjacent upper and lower scanning lines. For example, assume that pixels of three adjacent upper, middle and lower scanning lines at positions on the same vertical column are black, white and black, providing big differences in brightness among the adjacent pixels. In this case, since two adjacent black and white pixels are displayed on two different screens, flickering is seen.

Technologies for eliminating such flickering have been disclosed in Japanese Patent Laid-open Nos. Hei 6-83299, Hei 7-274086, Hei 6-46299 and Hei 8-317311. While there are differences in detail among these technologies, in the case of either of the technologies, a display control system is provided with a plurality of line buffers each used for storing image information of a scanning line. More particularly, the same plurality of line buffers are used for storing image information of the current scanning line and pieces of information of preceding scanning lines. Image information of the current scanning line is corrected by using the pieces of information of preceding scanning lines in order to prevent differences in image information among the scanning lines from becoming big.

SUMMARY OF THE INVENTION

In order to be capable of operating synchronously with a display timing, a line buffer must be implemented by an SRAM (Static Random-Access Memory) having a high speed. According to what has been disclosed in the documents cited above, a plurality of line buffers are required. Thus, a graphic control circuit composed of a large number of line buffers inevitably increases the cost of the display control circuit. In addition, according to the technologies adopted by the display control system for eliminating flickering, correction is carried out in an operation to output image data, after processing of the image data has been completed and the data has been stored in a frame buffer, synchronously with display scanning. In the prior technologies, processing to eliminate flickering by consideration of a source image prior to the rendering process is not carried out. In addition, with the prior technologies, freedom to arbitrarily determine the degree of processing is not taken into consideration.

It is thus an object of the present invention to provide a graphic processor and a data processing system which are capable of reducing a difference in image information between any two adjacent scanning lines without the need to newly add a line buffer.

It is another object of the present invention to provide a graphic processor and a data processing system which are capable of preventing flickering which might be generated in the display of image information produced originally for a non-interlace scanning display device by adopting the interlaced scanning technique, without the need to newly add a line buffer.

It is still another object of the present invention to provide a graphic processor and a data processing system which are capable of freely carrying out a processing to eliminate flickering of the screen caused by differences in resolution among pieces of image information in the display of the pieces of image information by overlaying one piece over another using the interlace scanning technique, without the need to newly add a line buffer.

It is a further object of the present invention to provide a low-cost graphic processor having an instruction for eliminating flickering.

It is a further object of the present invention to provide a data processing system capable of carrying out image-data processing to eliminate flickering by using a frame buffer memory.

The above and other objects, as various well as novel characteristics of the present invention will become more apparent from a study of the description provided in this specification with reference to the accompanying drawings.

Representative overviews of the present invention as disclosed in this application will be explained briefly as follows.

As shown in FIG. 1, a graphic processor 1 according to a first aspect of the present invention includes a rendering control circuit 2 for controlling an operation to draw image data on a memory unit 4 used as a frame buffer in accordance with a result of interpretation of a command, and a display control circuit 3 for controlling an operation to read out image data from the memory unit 4 in a scanning direction synchronously with a display scanning timing. Pieces of image data of source image information are laid out in the memory unit 4 to form a pixel-data matrix corresponding to a matrix of pixels with rows of the pixel-data matrix oriented in parallel to the scanning direction and columns thereof oriented perpendicularly to the scanning direction. The rendering control circuit 2 is capable of carrying out blend processing for correcting the source image information by execution of weighted averaging on any particular piece of image data of the source image information and pieces of image data on rows of the pixel-data matrix adjacent to a row of the particular piece of image data and on the same column of the pixel-data matrix perpendicular to the scanning direction as the particular piece of image data. A command or an instruction for carrying out the blend processing is defined for the graphic processor 1. By the execution of weighted averaging involving adjacent pieces of image data, it is possible to reduce a difference in image information between adjacent scanning lines, which is big in some cases. Such reduction of a difference is implemented by letting the rendering control circuit 2 merely read out pieces of data from the memory unit 4 sequentially, one piece after another, in a direction perpendicular to the scanning direction and to carry out the weighted averaging. Thus, it is not necessary to newly provide the display control circuit and, in particular, the rendering control circuit, with an additional storage device, such as a line buffer as described earlier.

As a result, a difference in image information between any two adjacent scanning lines can be reduced without the need to add a line buffer. Thus, image information completing the weighted averaging described above can be displayed by adopting the interlaced scanning system without causing undesired flickering.

By providing a graphic processor with an instruction for eliminating flickering, it is possible to present a low-cost graphic processor capable of eliminating flickering.

A graphic processor according to a second aspect of the present invention includes a rendering control circuit for controlling an operation to draw image data on a memory unit in accordance with a result of interpretation of a command, and a display control circuit for controlling an operation to read out image data from the memory unit in a scanning direction synchronously with a display scanning timing, wherein pieces of image data of source image information are laid out in the memory unit to form a pixel-data matrix corresponding to a matrix of pixels, with rows of the pixel-data matrix oriented in parallel to the scanning direction and columns thereof oriented perpendicularly to the scanning direction. The rendering control circuit is capable of executing a blend-processing command having: source specifying information for specifying a location of a piece of image data composing the source image information in the pixel-data matrix; command information for specifying blend processing for correcting the source image information by execution of weighted averaging on a particular piece of image data of the source image information indicated by the source specifying information and pieces of image data on rows of the pixel-data matrix adjacent to a row of the particular piece of image data and on the same column of the pixel-data matrix perpendicular to the scanning direction as the particular piece of image data; and destination specifying information for specifying a location at which a piece of image data obtained as a result of the weighted averaging is to be stored.

The blend-processing command makes the rendering control circuit capable of carrying out blend processing similar to a read-modify-write operation by execution of the steps of: reading out a particular piece of image data of the image information stored at a location in the pixel-data matrix corresponding to the pixel matrix specified by the source specifying information from the memory unit; performing weighted averaging on the particular piece of image data read out from the memory unit and pieces of image data on rows of the pixel-data matrix adjacent to a row of the particular piece of image data and on the same column of the pixel-data matrix perpendicular to the scanning direction as the particular piece of image data; and storing a result of the weighted averaging back into the memory unit. As a result, it is not necessary to newly provide the display control circuit and, in particular, the rendering control circuit, with an additional storage device, such as a line buffer, and it is possible to reduce the difference in image information between adjacent scanning lines, which is big in some cases.

Since the source specifying information and the destination specifying information of the blend-processing command can be set arbitrarily, it is possible to determine any arbitrary area in the display area subjected to the weighted averaging with a high degree of freedom. In an operation to overlay an image produced by a computer over a natural image, for example, it is possible to carry out the weighted averaging only on the image produced by the computer. That is, blend processing can be carried out only on a necessary portion of image information, allowing wasted processing to be eliminated. As a result, blend processing can be carried out in a short period of time, while still providing an improved picture quality.

The blend-processing command can be further provided with first-attribute information for specifying whether adjacent pieces of image data subjected to the weighted averaging on the same column perpendicular to the scanning line as the particular piece of image data are those on rows preceding and succeeding the row of the particular piece of image data, those on only rows preceding the row of the particular piece of image data or those on only rows succeeding the row of the particular piece of image data. It is quite within the bounds of possibility that the image blurs adversely as a result of excessive weighted averaging. It is thus necessary to select a degree to which the weighted averaging is to be carried out on source data subjected to the blend processing in accordance with characteristics of the source data. By doing so, a flicker free picture with a high quality can be obtained.

In addition, the blend-processing command can be further provided with second-attribute information for specifying that image data completing the weighted processing be stored only in an area that is included in a clipping area and is specified by the destination specifying information. Thus, a clipping area can also be used in conjunction with the destination specifying information. As a result, the operability of the blend processing can be improved, allowing the graphic processor to be used more in a way desired by the user.

A data processing system according to a third aspect of the present invention comprises a central processing unit, a graphic processor, a memory unit used as a frame buffer and a display device. The graphic processor includes a rendering control circuit for controlling an operation to draw image data on a memory unit in accordance with a result of interpretation of a command issued by the central processing unit, and a display control circuit for controlling an operation to read out image data from the memory unit in a scanning direction synchronously with a display scanning timing, wherein pieces of image data of source image information are laid out in the memory unit to form a pixel-data matrix corresponding to a matrix of pixels with rows of the pixel-data matrix oriented in parallel to the scanning direction and columns thereof oriented perpendicularly to the scanning direction. The rendering control circuit is capable of carrying out blend processing similar to a read-modify-write operation by execution of the steps of: reading out a particular piece of image data of the image information stored at a location in the pixel-data matrix corresponding to the pixel matrix specified by source specifying information from the memory unit; performing weighted averaging on the particular piece of image data read out from the memory unit and pieces of image data on rows of the pixel-data matrix adjacent to a row of the particular piece of image data on the same column of the pixel-data matrix perpendicular to the scanning direction as the particular piece of image data; and storing a result of the weighted averaging back into the memory unit. As a result, it is not necessary to newly provide the display control circuit and, in particular, the rendering control circuit, with an additional storage device, such as the line buffer, and it is possible to reduce the difference in image information between adjacent scanning lines, which is big in some cases.

The central processing unit is capable of issuing a blend-processing command requesting the graphic processor to carry out the blend processing. The blend-processing command can be provided with: source specifying information for specifying a location of a piece of information data composing the source image information in the pixel-data matrix; command information for specifying blend processing for correcting the source image information by execution of weighted averaging on a particular piece of image data of the source image information indicated by the source specifying information and pieces of image data on rows of the pixel-data matrix adjacent to a row of the particular piece of image data and on the same column of the pixel-data matrix perpendicular to the scanning direction as the particular piece of image data; and destination specifying information for specifying a location at which a piece of image data obtained as a result of the weighted averaging is to be stored.

The blend-processing command can be further provided with first-attribute information for specifying whether adjacent pieces of image data subjected to the weighted averaging carried out by the rendering control circuit on the same column of the pixel-data matrix perpendicular to the scanning line as the particular piece of image data are those on rows of the pixel-data matrix preceding and succeeding the row of the particular piece of image data, those on only rows preceding the row of the particular piece of image data or those on only rows succeeding the row of the particular piece of image data. In addition, the blend-processing command may include second-attribute information. In this case, the rendering control circuit is provided with a clipping register containing information set therein by the central processing unit to specify a clipping area. In a first state, the second attribute information is used for specifying that image data completing the weighted processing be stored only in an area that is included in the clipping area and is specified by the destination specifying information. In a second state, on the other hand, the second attribute information is used for specifying that image data completing the weighted processing be stored only in an area specified by the destination specifying information without regard to the clipping area. As a result, it is possible to determine a degree to which processing to eliminate flickering is to be carried out by paying attention to a source image prior to the rendering. In addition, it is also possible to achieve freedom to determine whether image data completing the weighted processing be stored only in an area that is included in the clipping area and is specified by the destination specifying information, or be stored in an area specified by the destination specifying information without regard to the clipping area.

As described above, by merely providing a graphic processor with an instruction for eliminating flickering, flickering can be eliminated by adoption of a software technique. Embedded as an instruction in a graphic processor, the flickering elimination software technique can be applied to a variety of data processing systems that employ a graphic processor.

BRIEF DESCRIPTION OF THE DRAWINGS

FIG. 5A and FIG. 5B are tables describing typical rendering commands executed by the rendering unit;

FIG. 12 is a block diagram showing a typical configuration of a blend module;

FIG. 15 is a table individually describing conditions for transition of states controlled by the control unit;

PREFERRED EMBODIMENTS

Data Processing System

Figure 2:
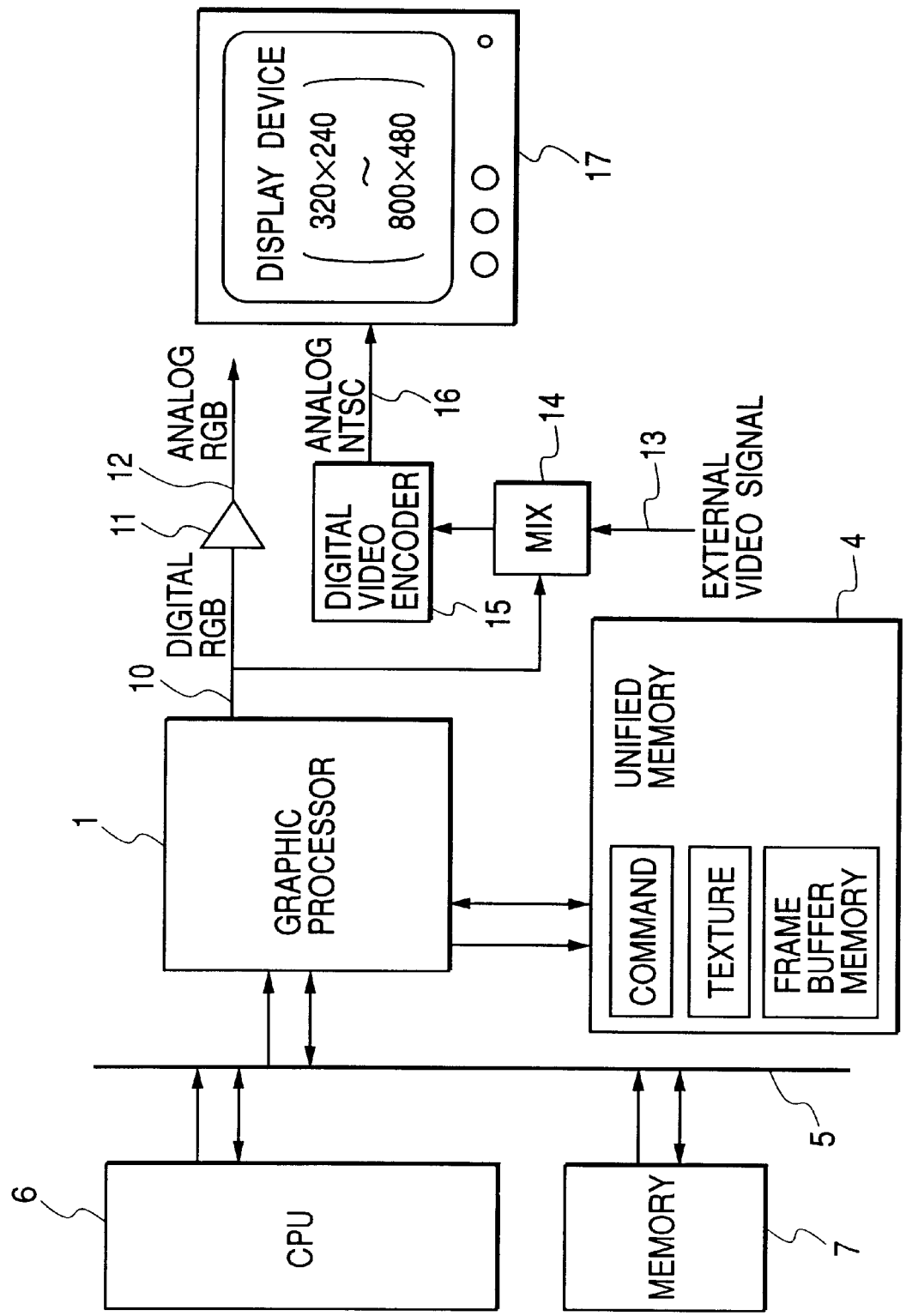
FIG. 2 is a block diagram showing the configuration of a data processing system implemented by an embodiment of the present invention.

FIG. 2 is a block diagram showing the configuration of a data processing system implemented by an embodiment of the present invention. Composed of signal lines conveying address, data and control signals, a system bus 5 is connected to a CPU (Central Processing Unit) 6 implemented by a microprocessor or a microcomputer, a memory unit 7 and a graphic processor 1. The memory unit 7 forms a so-called main memory used as a working area of the CPU 6 or an area for temporarily storing data. Separated from each other, the CPU 6 and the graphic processor 1 are each implemented by a semiconductor integrated circuit created on a single semiconductor substrate made of a material such as monolithic-crystal silicon.

In the case of an application wherein the data processing system shown in the figure is applied to a navigation system, the system bus 5 is further connected to circuits, such as an interface circuit of a drive unit for making accesses to map data and an interface circuit of a position detecting circuit. These circuits are not shown in the figure. In the case of an application wherein the data processing system shown in the figure is applied to an Internet television, on the other hand, the system bus 5 is further connected to devices, such as a modem or a terminal adapter. These devices are also not shown in the figure.

Used as a local memory, a unified memory unit 4 is connected to the graphic processor 1. Implemented typically by a synchronous DRAM (dynamic random-access memory), the unified memory unit 4 comprises a command area, a frame-buffer area and a basic-data (texture) area.

The graphic processor 1 carries out processing, such as control of an operation to render image data into the unified memory unit 4, in accordance with a result of interpreting a command issued by the CPU 6 and stored in the unified memory unit 4, and control of an operation to read out image data rendered in the unified memory unit 4 synchronously with display scanning timing in the scanning direction.

Image data output by the graphic processor 1 synchronously with the display timing is typically digital RGB data 10 having 1 pixel per 18 bits. However, the image data is not limited to such digital RGB data. The digital RGB data 10 is converted into an analog RGB signal 12 by a D/A converter 11. In addition, the digital RGB data 10 is supplied to a mixer 14 to be mixed with an external video signal 13. A mixed signal output by the mixer 14 is converted by a digital video encoder 15 into an analog NTSC signal 16, that is, a television signal conforming to the NTSC specifications. The analog RGB signal 12 is supplied to the display device 17 shown in FIG. 2, provided that the display device 17 is an analog monitor such as a VGA (Video Graphics Array) or an SVGA (Super VGA) device. If the display device 17 is a television-set monitor, on the other hand, it is the analog NTSC signal 16 that is supplied thereto. If the display device 17 is a digital monitor of a navigation system, the digital RGB signal is supplied thereto directly. It should be noted that a D/A converter 11 embedded in the graphic processor 1 effectively reduces the number of external pins of a semiconductor integrated circuit implementing the graphic processor 1.

Graphic Processor

Figure 1:
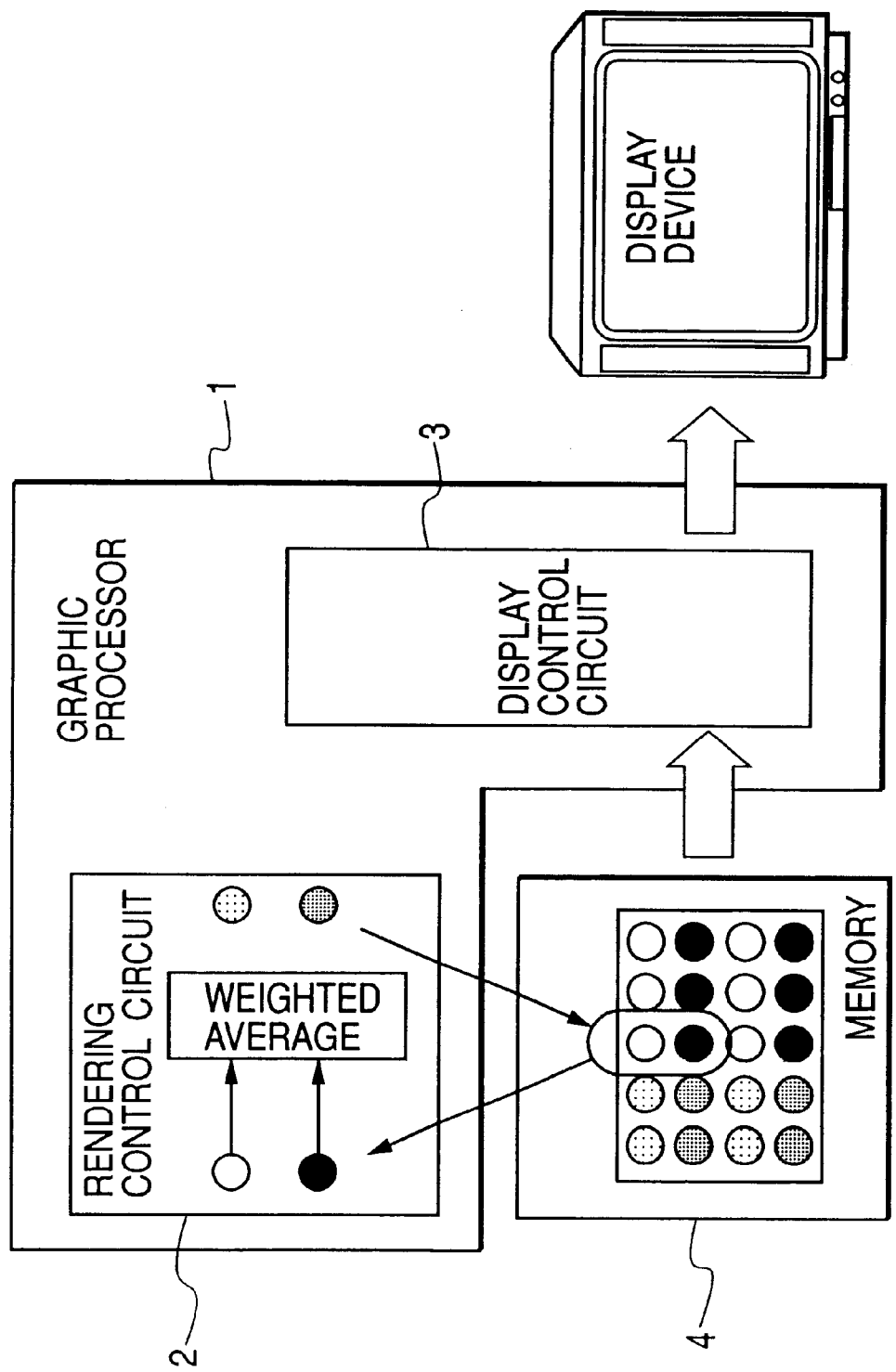
FIG. 1 is an explanatory block diagram used for describing the principle of blend processing carried out by a rendering control circuit employed by a graphic processor implemented by an embodiment of the present invention.
Figure 3:
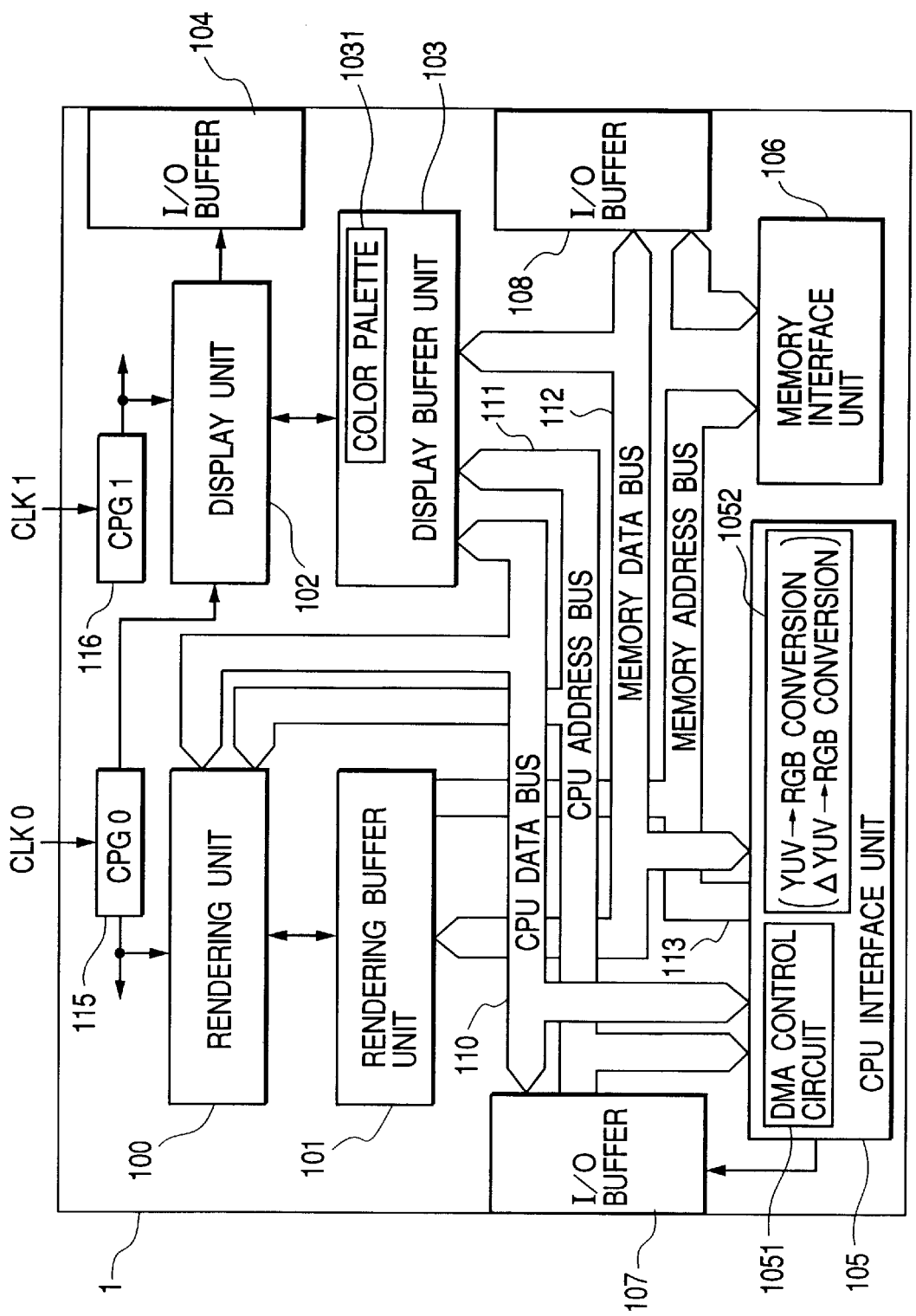
FIG. 3 is a block diagram showing a typical configuration of the graphic processor.

FIG. 3 is a block diagram showing a typical configuration of the graphic processor 1. As shown in the figure, the graphic processor 1 has a rendering unit 100, a rendering buffer 101, a display unit 102 and a display buffer 103. The rendering unit 100 serves as the rendering control circuit 2 of FIG. 1, which is also referred to hereafter as a rendering control means 2, and the display unit 102 serves as the display control circuit 3 of FIG. 1, which is also referred to hereafter as a display control means 3.

The digital RGB data 10 is output by the display unit 102 by way of an I/O buffer 104. A CPU interface unit 105 is used for controlling external interfaces with the CPU 6 and a memory interface unit 106 is used for controlling external interfaces with the unified memory unit 4. An I/O buffer 107 is connected to the CPU 6 through the system bus 5 and an I/O buffer 108 is connected to the unified memory unit 4. A clock signal CLK0 is a basic clock signal for driving the operation of the graphic processor 1 and a clock signal CLK1 is a generic timing signal representing a vertical-synchronization signal, a horizontal-synchronization signal and a dot-clock signal. A clock-pulse generator CPG0 denoted by reference numeral 115 divides the frequency of the clock signal CLK0 to generate a variety of internal synchronization signals. A clock-pulse generator CPG0 denoted by reference numeral 116 generates internal timing signals for synchronizing display control systems such as the display unit 102 with display timing on the basis of the clock signal CLK1.

The rendering buffer unit 101 is used as a buffer between the unified memory unit 4 external to the graphic processor 1 and the rendering unit 100. To be more specific, data read out from the memory-buffer area of the unified memory unit 4 and data to be written into the memory-buffer area is temporarily stored in the rendering buffer unit 101. In addition, information, such as a command and a texture, read out from the unified memory unit 4 are also temporarily stored in the rendering buffer unit 101. On the other hand, the display buffer unit 103 is used as a buffer between the unified memory unit 4 and the display unit 102. To be more specific, image information read out from the frame-buffer area of the unified memory unit 4 is temporarily stored in the display buffer unit 103 before being passed on to the display unit 102. The display buffer unit 103 has a color pallet 1031 for converting image data of 1 pixel per 8 bits into image data of 1 pixel per 16 bits. The CPU interface unit 105 comprises components including a DMA (Direct Memory Access) control circuit 1051 and a data-format converting circuit 1052. The data-format converting circuit 1052 converts a digital video format YUV or a digital video format ΔYUV for a navigation system into an RGB (Red, Green and Blue) format. It should be noted that the symbol Y represents luminance while notation U/V is a chrominance difference component.

The CPU interface unit 105, the rendering unit 100, the display buffer unit 103 and the I/O buffer 107 share a CPU data bus 110. An address signal is supplied from the CPU 6 to the I/O buffer unit 107 to be passed on to the CPU interface unit 105, the rendering unit 100 and the display buffer unit 103 through the CPU address bus 111. In this way, the shared CPU data bus 110 and the shared CPU address bus 111 make the CPU 6 capable of carrying out processing, such as initialization of control information for the DMA control circuit 1051 employed in the CPU interface unit 105, the rendering unit 100 and the color pallet 1031, employed in the display buffer unit 103.

On the other hand, the CPU interface unit 105, the rendering buffer unit 101, the display buffer unit 103 and the I/O buffer 108 share a memory data bus 112 for exchanging data between the display buffer unit 103 or the rendering buffer unit 101 and the unified memory unit 4 by way of I/O buffer 108. The CPU interface unit 105, the rendering buffer unit 101 and the memory interface unit 106 share a memory address bus 113 used by the CPU interface unit 105 or the rendering buffer unit 101 to output an address signal to the memory interface unit 106. In this way, the memory interface unit 106 controls interfaces with the unified memory unit 4.

The rendering unit 100 carries read out and write operations with respect to the unified memory unit 4 through the rendering buffer unit 101, the memory data bus 112, the memory address bus 113 and the memory interface unit 106. It should be noted, however, that the technique to transfer image data from the frame-buffer area of the unified memory unit 4 to the display buffer unit 103 is not limited specially to the use of the DMA control unit 1051.

A series of commands and a texture can be written respectively into the command and texture areas of the unified memory unit 4 by way of the memory data bus 112 under control executed by the DMA control circuit 1051 in accordance with control information set by the CPU 6 in the DMA control circuit 1051 as initial values.

Rendering Unit

Figure 4:
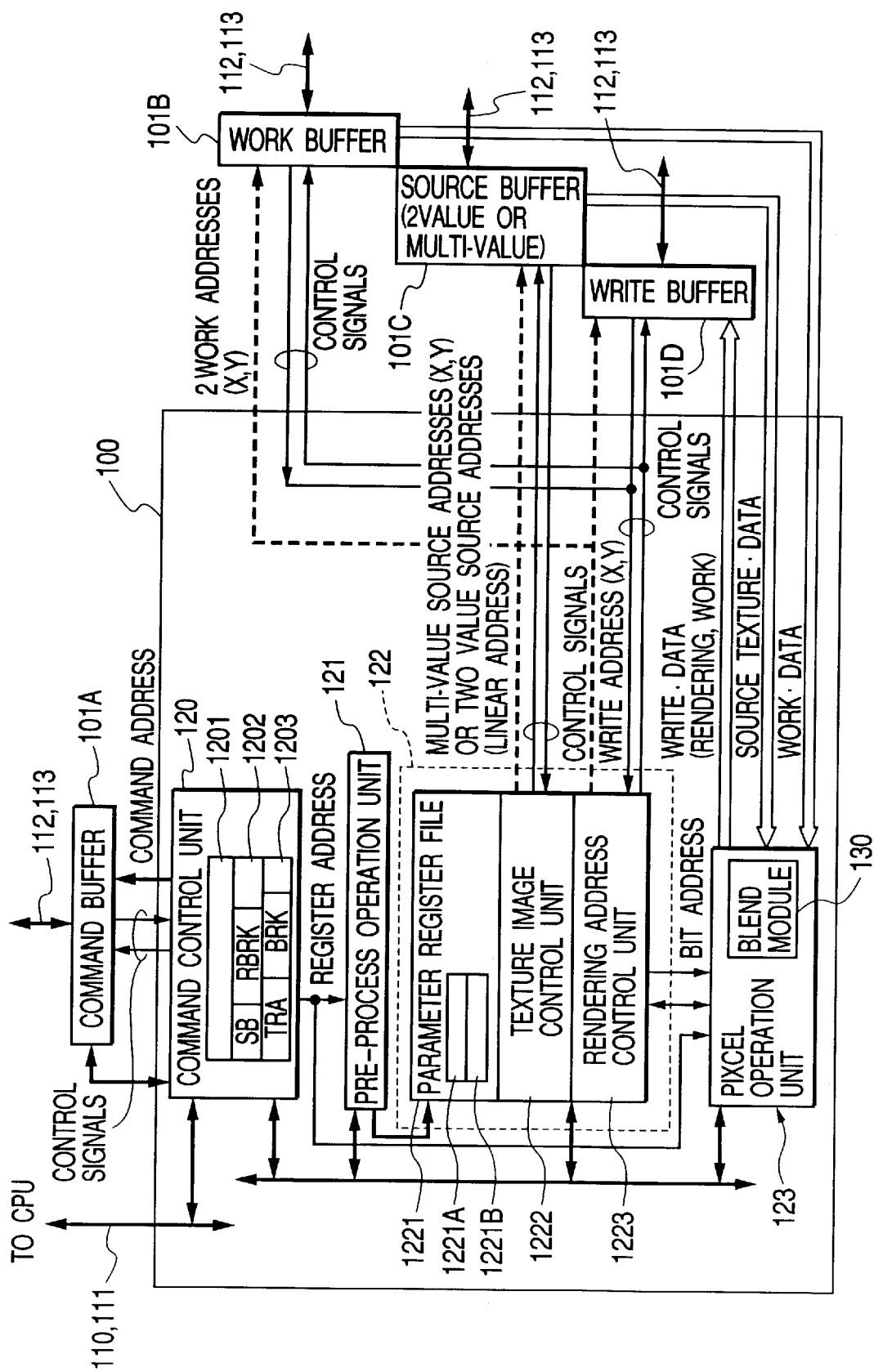
FIG. 4 is a block of diagram a typical rendering unit.

FIG. 4 is a block diagram showing a typical rendering unit 100 and a typical rendering buffer unit 101. A command buffer 101A, a work buffer 101B, a source buffer 101C and a write buffer 101D are included in the rendering buffer unit 101. The rendering unit 100 can be considered to comprise mainly a command control unit 120, a preprocess operation unit 121, an address processing unit 122 and a pixel processing unit 123.

The command control unit 120 controls operations to fetch a command, decode the command and transfer parameters of the command. Commands to be executed by the rendering unit 100 are stored in the unified memory unit 4. Commands stored in the unified memory unit 4 form a command series comprising a plurality of commands for driving a specific rendering task. The series of commands which are originally issued by the CPU 6 and received through the CPU interface unit 105 are stored in the specified address area (command area). The command control unit 120 includes a command-series-start-address register 1201, a system control register 1202 and a status register 1203. The command-series-start-address register 1201 and the system control register 1202 are initialized by the CPU 6. The system control register 1202 includes a start bit SB set by the CPU 6 for requesting that the execution of a series of commands be started and a suspension requesting bit RBRK set by the CPU 6 for requesting that the execution of a series of commands be suspended. The status register 1203 includes an execution completion bit TRA set by the rendering unit 100 upon completion of execution of the last command of a series of commands being executed to indicate that the execution of the series of commands has been completed, and a suspension completion bit BRK set by the rendering unit 100 upon suspension of execution of a series of commands being executed as requested by a suspension command to indicate that the execution of the series of commands has been suspended. After a series of commands are stored in the command area of the unified memory unit 4, the CPU 6 sets the start address of the series of commands in the command-series-start-address register 1201, then sets the start bit SB of the system control register 1202. In this state, the command control unit 120 reads out the series of commands from the command area of the unified memory unit 4 starting with a command at the start address indicated by the command-series-start-address register 1201, and transfers the series of commands to the command buffer 101A. The command control unit 120 then fetches the series of commands from the command buffer 101A sequentially, decodes each of the commands and controls the internal operation of the rendering unit 100. Completion of execution of the last command in the executed series of commands is reported to the CPU 6 by setting the execution completion TRA bit. If the CPU 6 sets the suspension requesting RBRK bit to request that the execution of the series of commands be suspended in the course of the execution after the execution has been started, the execution is suspended. Upon suspension of the execution, the suspension completion BRK bit is set by the rendering unit 100 to inform the CPU 6 that the execution of the series of commands has been suspended. Detecting the set state of the suspension completion BRK bit, the CPU 6 is then capable of carrying out processing to drive the rendering unit 100 to branch to execution of another rendering task.

The preprocess operation unit 121 carries out a preprocess operation, such as polygon-side processing, to extract coordinates of vertexes of right and left sides of a polygon in accordance with a command code and command arguments, such as specified polygon coordinates and the color of a pattern, which are obtained as a result of the operation carried out by the command control unit 120 to decode a command. The address processing unit 122 includes a parameter register file 1221, a texture-image control unit 1222 and a rendering-address control unit 1223.

The parameter register file 1221 includes a system-clipping-area specifying register 1221A for specifying a system clipping area and a user-clipping-area specifying register 1221B for specifying a user clipping area. Parameters output by the CPU 6 are set in the system-clipping-area specifying register 1221A and the user-clipping-area specifying register 1221B through parameter transfer control executed by the command control unit 120.

The texture-image control unit 1222 computes an address of source data to be used in a rendering operation. The computed address of the source data is supplied to the unified memory unit 4 by way of the source buffer 101C. Source data at the address is then read out from the unified memory unit 4 to be temporarily stored also in the source buffer 101C.

The rendering-address control unit 1223 computes a rendering address and a pixel address such as an address of work data. For example, the rendering-address control unit 1223 computes coordinates at pixels of positions horizontally connecting vertexes of sides obtained as a result of the side processing described above.

The pixel processing unit 123 processes pixel data at a pixel address. The processing of pixel data is based on, among other information, work data obtained from the unified memory unit 4 and stored in the work buffer 101B and source data obtained from the unified memory unit 4 and stored in the source buffer 101C. A result of the processing of pixel data is stored in the write buffer 101D for use in rendering to the frame-buffer area of the unified memory unit 4.

The processing of pixel data carried out by the pixel processing unit 123 includes conversion of 2-value data into multi-value data and a painting-out operation. The processing of pixel data also allows blend processing to be carried out by a blend module 130 to correct source image information. Details of the blend processing will be described later. In the blend processing, a weighted average of adjacent pieces of pixel data is computed to reduce the difference in image information between adjacent scanning lines, which is big in some cases.

Blend Processing

Figure 6:
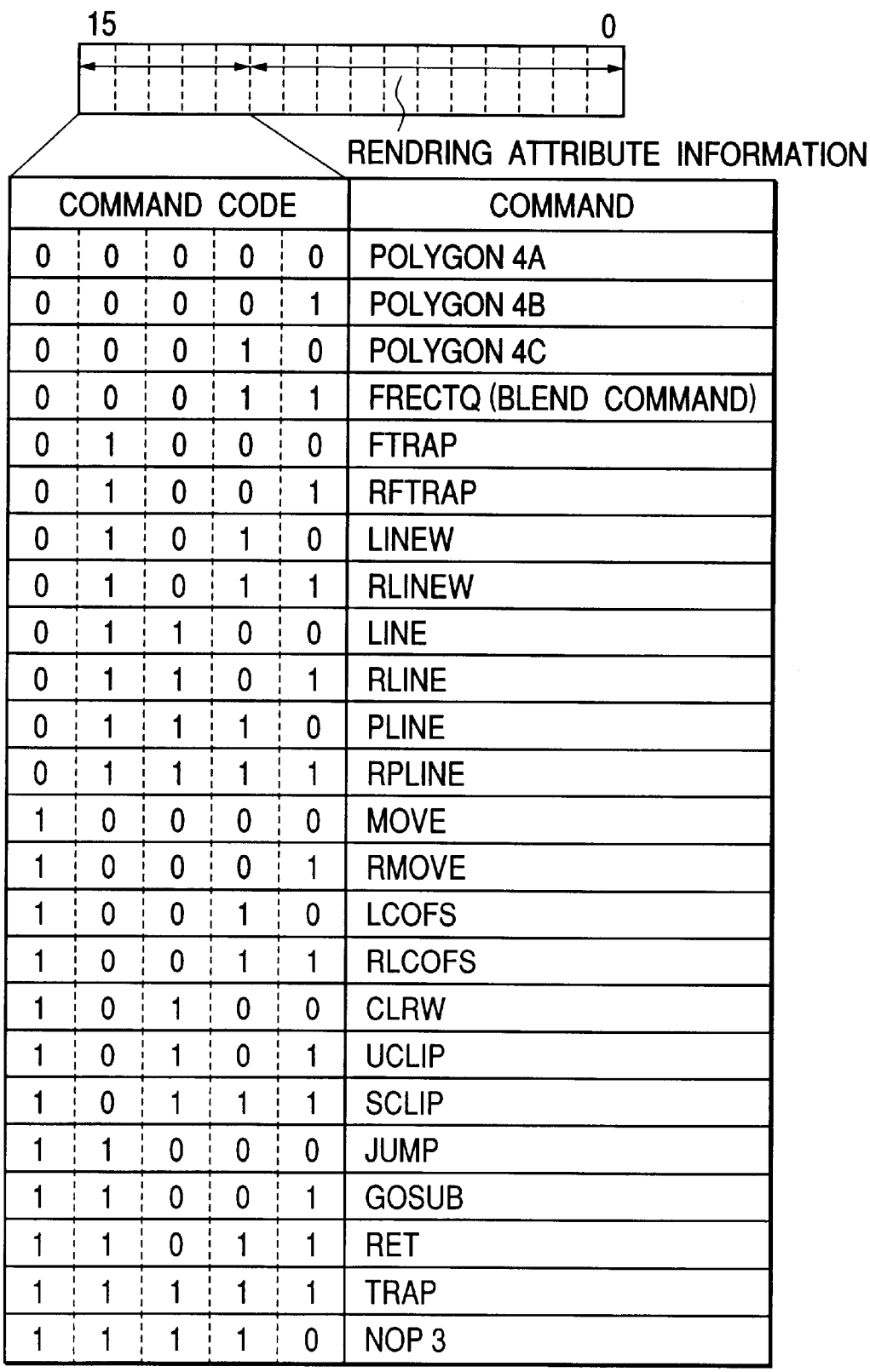
FIG. 6 is a table describing command codes of the rendering commands.
Figure 7:
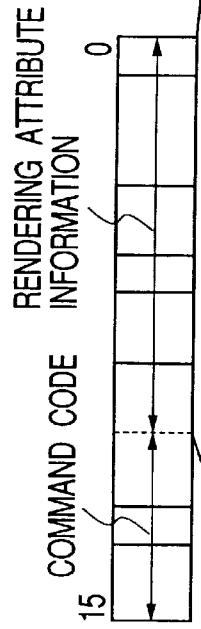
FIG. 7 is a table describing rendering attribute information of the rendering commands.

FIG. 5A and FIG. 5B are explanatory tables used for describing typical rendering commands executed by the rendering unit 100. FRECTQ shown in the table is a blend-processing command to be executed to carry out the blend processing. Pneumonic FRECTQ is abbreviation for filtered rectangle rendering, a sort of 4-apex drawing. As shown by a table shown in FIG. 6, a rendering command comprises a command code and rendering-attribute information which is described by a table shown in FIG. 7. As shown in the table of FIG. 7, the FRECTQ rendering command has two pieces of rendering-attribute information, namely, the first attribute information FILT and the second attribute information CLIP. The meanings of the first attribute information FILT and the second attribute information CLIP will be described later.

Figure 8:
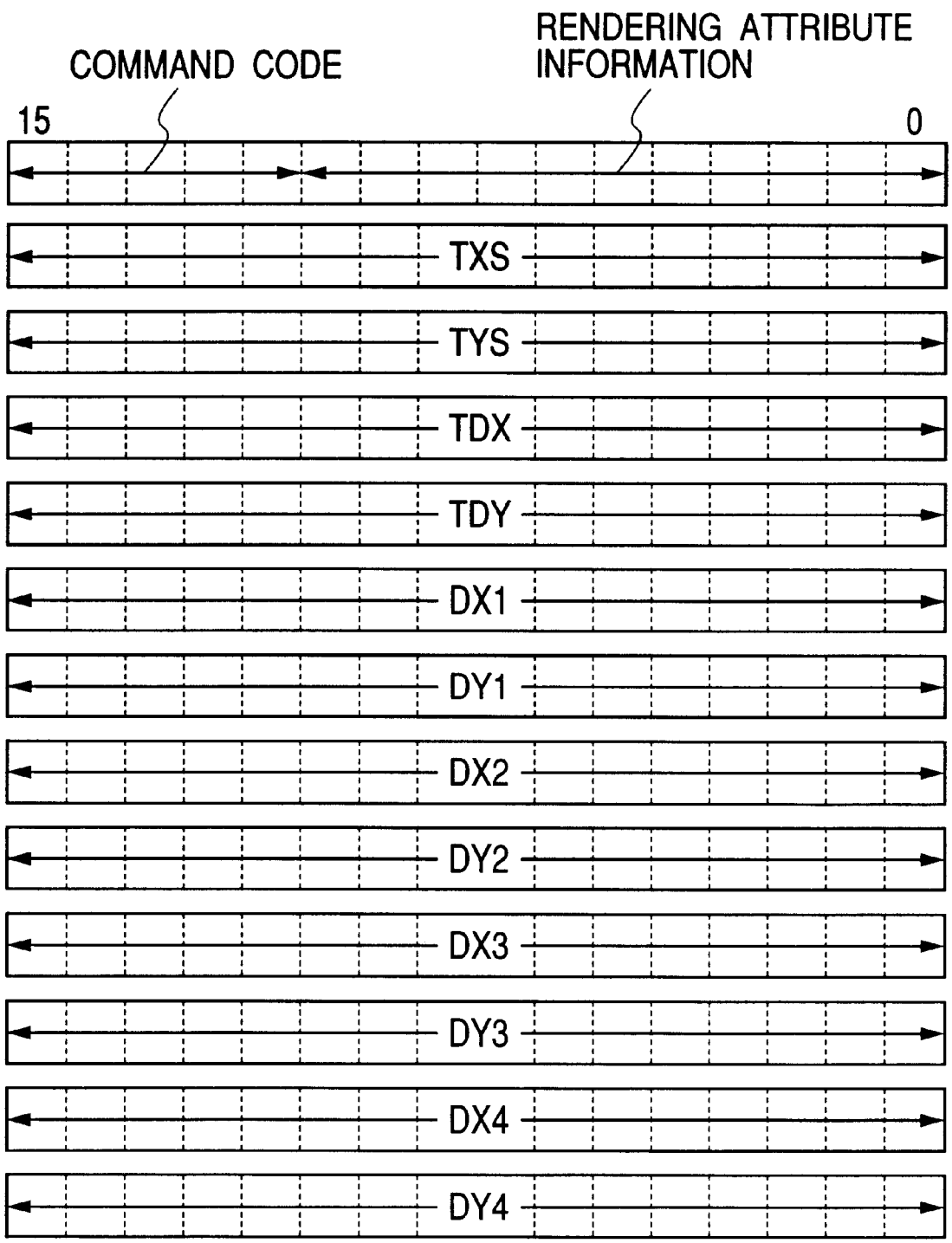
FIG. 8 is an explanatory diagram used for describing a typical blending-processing command and command arguments thereof.
Figure 9:
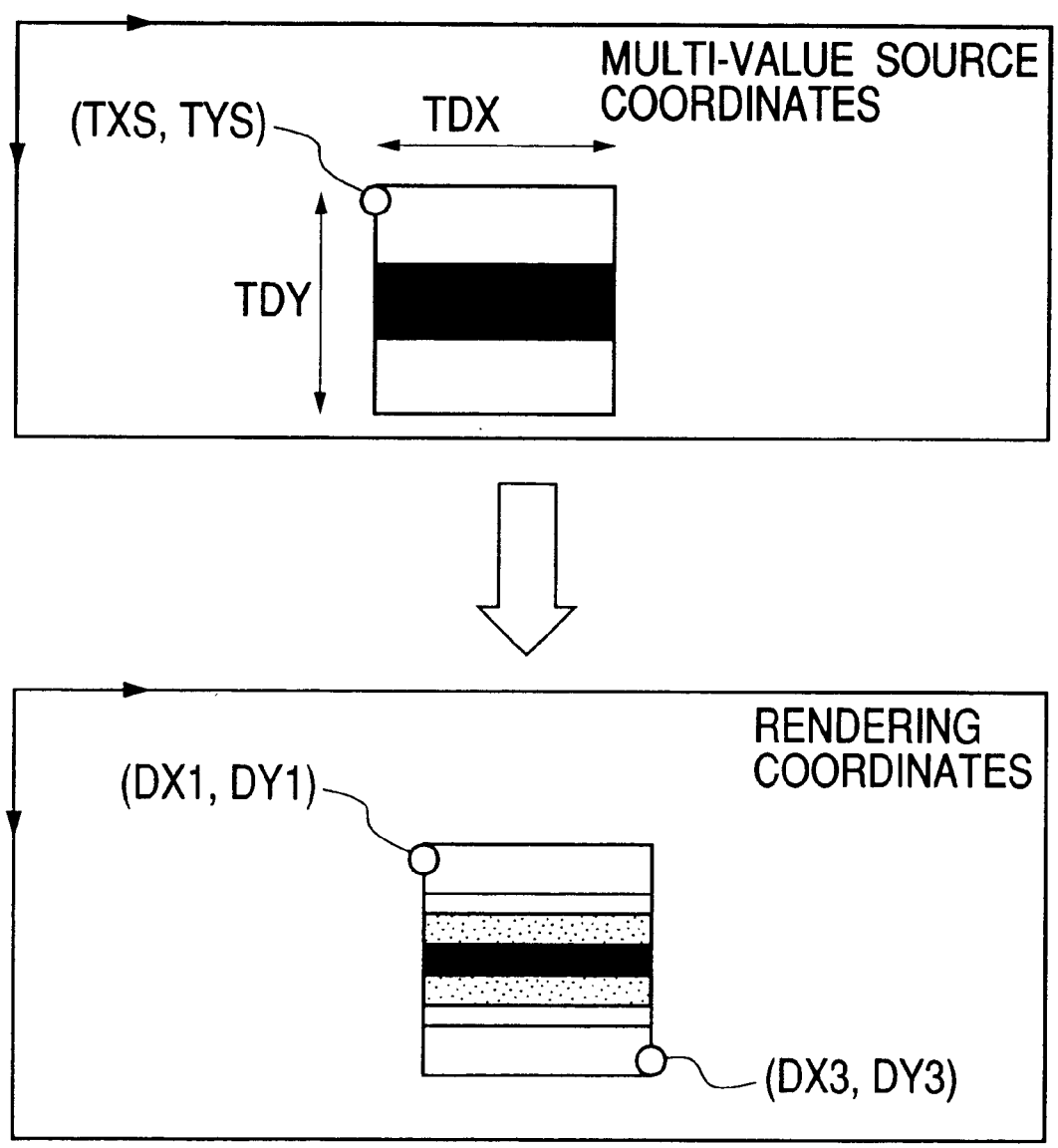
FIG. 9 is an explanatory diagram showing a model of processing carried out by execution of a blend-processing command.

FIG. 8 is an explanatory diagram used for describing a typical blending-processing command and command arguments thereof. FIG. 9 is an explanatory diagram showing a model of processing carried out by execution of a blend-processing command. As shown in FIG. 8, the command arguments are TXS, TYS, TDX, TDY, DX1, DY1, DX2, DY2, DX3, DY3, DX4 and DY4. The blend-processing command reads out source image information with a rectangular form specified by the arguments TXS, TYS, TDX and TDY, then modifies the source image information and, finally, writes the modified image information into rendering coordinates specified by the arguments DX1, DY1, DX2, DY2, DX3, DY3, DX4 and DY4. The modify processing is the blend processing itself, that is, weighted averaging of data of each pixel and data of other pixels adjacent thereto in the column direction in order to reduce a difference in chrominance and luminance among adjacent scanning lines. Here, by the column direction, a direction perpendicular to the scanning direction is meant.

Figure 10:
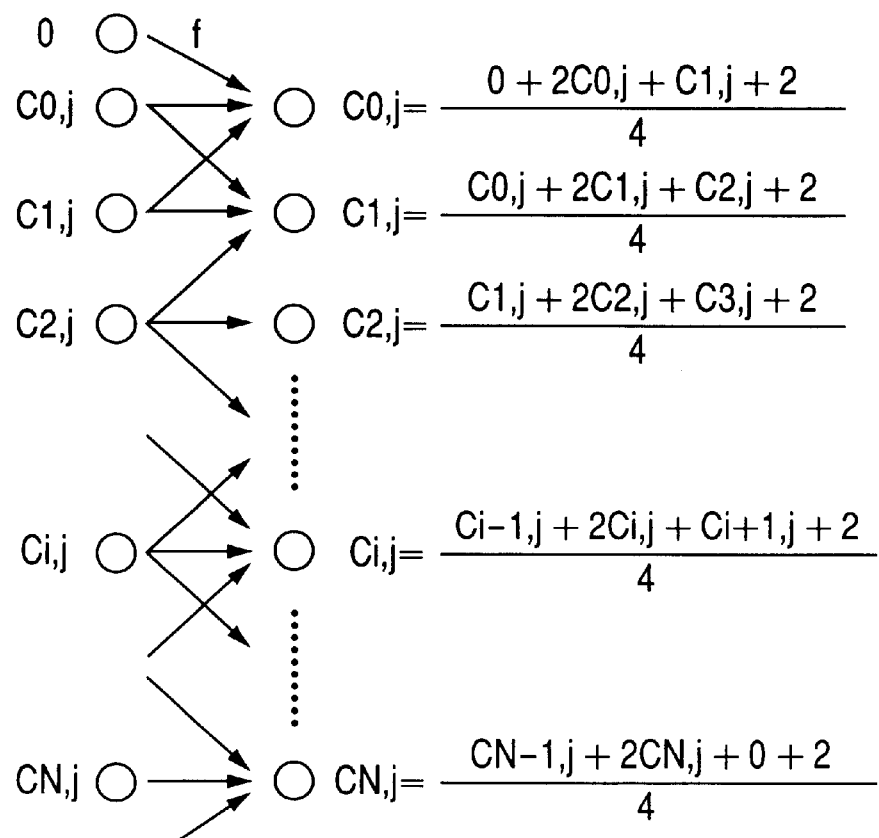
FIG. 10 is an explanatory diagram used for describing a typical basic algorithm of the blend processing to compute a weighted average of three pieces of data on three adjacent lines.
Figure 11:
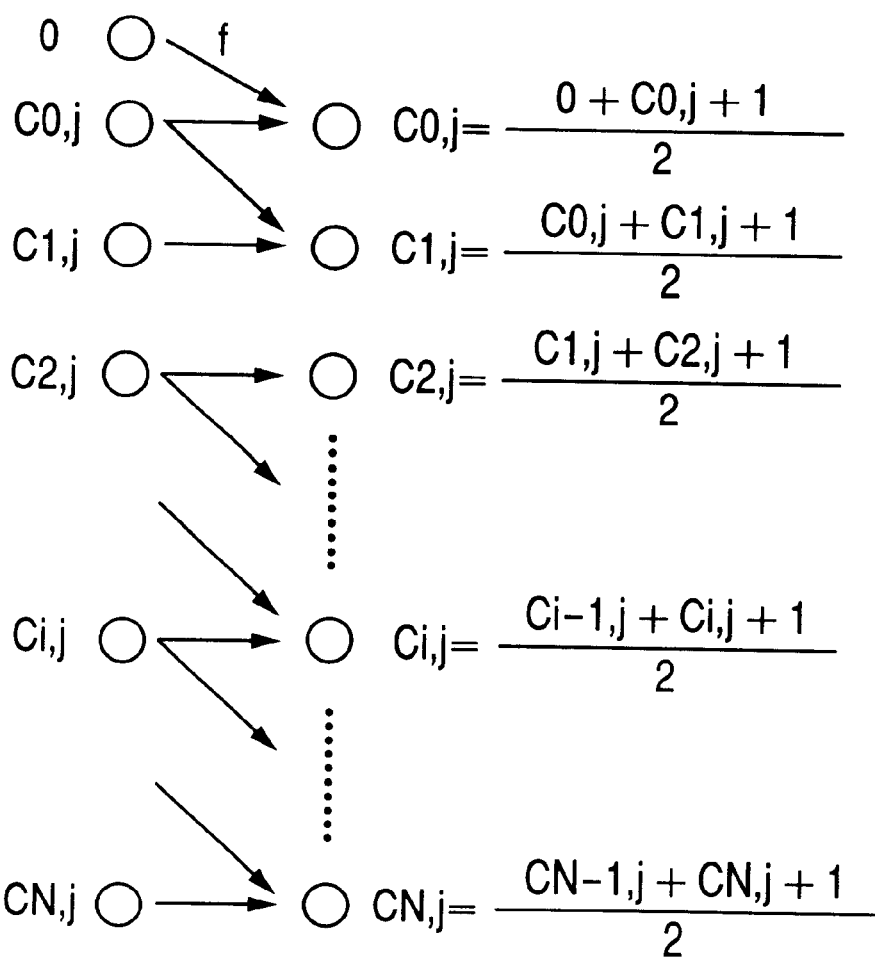
FIG. 11 is an explanatory diagram used for describing a typical basic algorithm of the blend processing to compute a weighted average of two pieces of data on two adjacent lines.

FIGS. 10 and 11 are diagrams each showing a basic algorithm adopted in the blend processing. More specifically, FIG. 10 is an explanatory diagram used for describing a typical basic algorithm of the blend processing to compute a weighted average of three pieces of data of pixels on three adjacent lines and FIG. 11 is an explanatory diagram used for describing a typical basic algorithm of the blend processing to compute a weighted average of two pieces of data of pixels on two adjacent lines. One of the algorithms is selected in accordance with the rendering attribute information FILT. To be more specific, for TILT=1, the 3-line weighted averaging algorithm is selected. For TILT=0, on the other hand, the 2-line weighted averaging algorithm is selected.

According to the 3-line weighted averaging algorithm shown in FIG. 10, a sum of pixel data $C_{i,j}$ on the ith row and the jth column with a weight of 2 and pixel data $C_{i-1,j}$ and $C_{i+1,j}$ on the adjacent (i+1)th and (i−1)th rows and the same column each with a weight of 1 is divided by 4 to find a weighted average. Here, a row is an array of pixels arranged in a scanning direction, that is, the horizontal direction, whereas a column is an array of pixels arranged in a direction perpendicular to the scanning direction, that is, the vertical direction. Since the division of the sum by 4 is implemented by bit shifting the sum to the right, that is, the less-significant-bit direction, by 2 bits, a value of 2 is added to the sum from the beginning. In this way, the result of the bit shifting is not a result of truncation, but a result of rounding. It should be noted that, in the computation of a 3-line weighted average for the first row, a value of 0 is used as a substitute for pixel data on a non-existing row preceding the first row. As for the last row, a value of 0 is used as a substitute for pixel data on a non-existing row succeeding the last row.

As for the 2-line weighted averaging algorithm shown in FIG. 11, a sum of pixel data $C_{i,j}$ on the ith row and the jth column with a weight of 1 and pixel data $C_{i-1,j}$ on the preceding (i−1)th row and the same column also with a weight of 1 is divided by 2 to find a weighted average. Since the division of the sum by 2 is implemented by bit shifting the sum to the less-significant-bit direction by 1 bit, a value of 1 is added to the sum from the beginning. In this way, the result of the bit shifting is not a result of truncation, but a result of rounding. It should be noted that, in the computation of a 2-line weighted average for the first row, a value of 0 is used as a substitute for pixel data on a non-existing row preceding the first row.

As is obvious from the weighted averaging algorithms shown in FIGS. 10 and 11, in the computation of weighted averages, pieces of pixel data $C_{0,j}$ to $C_{N,j}$ are read out sequentially piece by piece in a direction perpendicular to the scanning direction while, at the same time, scanning to write back the weighted averages is being carried out in the same direction in which the pieces of pixel data $C_{0,j}$ to $C_{N,j}$ are read out. Thus, it is not necessary at all to provide line buffers for storing pieces of whole line image information of a plurality of consecutive scanning lines.

FIG. 12 is a block diagram showing a typical configuration of the blend module 130. As shown in the figure, the blend module 130 comprises 2 main components, namely, a control unit 131 and a processing unit 132. Notations in_red, in_green and in_blue are red 5-bit pixel data, green 6-bit pixel data and blue 5-bit pixel data of source image data, respectively. An in_valid signal is set at a logic value of 1 to indicate that the pieces of pixel data in_red, in_green and in_blue are valid and reset at a logic value of 0 to indicate that the pieces of pixel data in_red, in_green and in_blue are invalid. A CMD signal is set at a logic value of 1 during execution of a blend-processing command. Otherwise, the CMD signal is reset at a logic value of 0. The pieces of pixel data out_red, out_green and out_blue are pixel data completing the weighted averaging. A first_line signal is set at a logic value of 1 to indicate that the pieces of pixel data in_red, in_green and in_blue are included in the first line and reset at a logic value of 0 to indicate that the pieces of pixel data in_red, in_green and in_blue are not included in the first line. The first line is a first row of pieces of pixel data or a first array of pieces of pixel data in the horizontal direction in an area subjected to the blend processing. An end_line signal is set at a logic value of 1 to indicate that the pieces of pixel data in_red, in_green and in_blue are included in the last line and reset at a logic value of 0 to indicate that the pieces of pixel data in_red, in_green and in_blue are not included in the last line. The last line is a last row of pieces of pixel data or a last array of pieces of pixel data in the horizontal direction in an area subjected to the blend processing. Notation reset denotes a reset signal.

Figure 13:
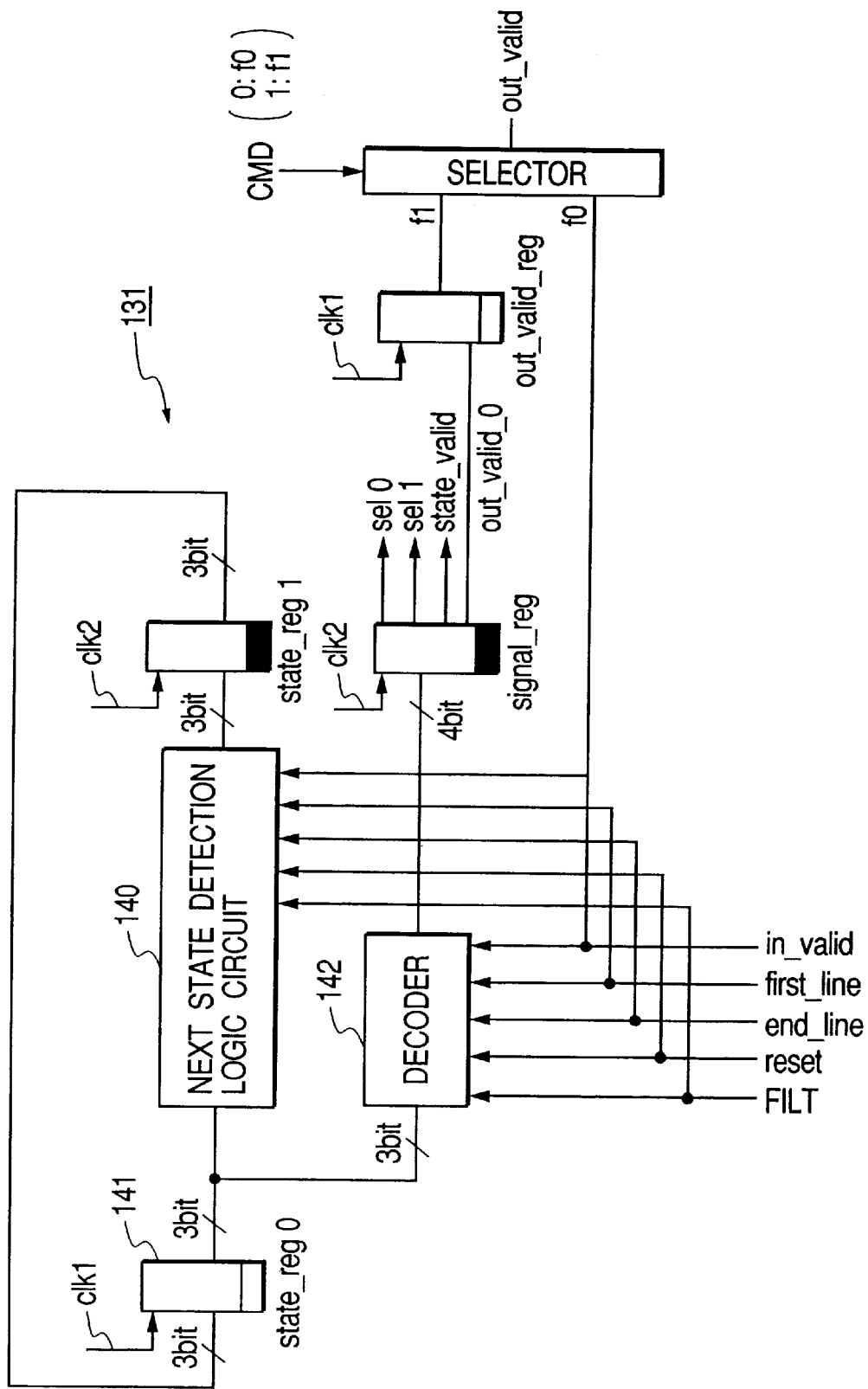
FIG. 13 is a block diagram showing a typical configuration of a control unit included in the blend module.
Figure 14:
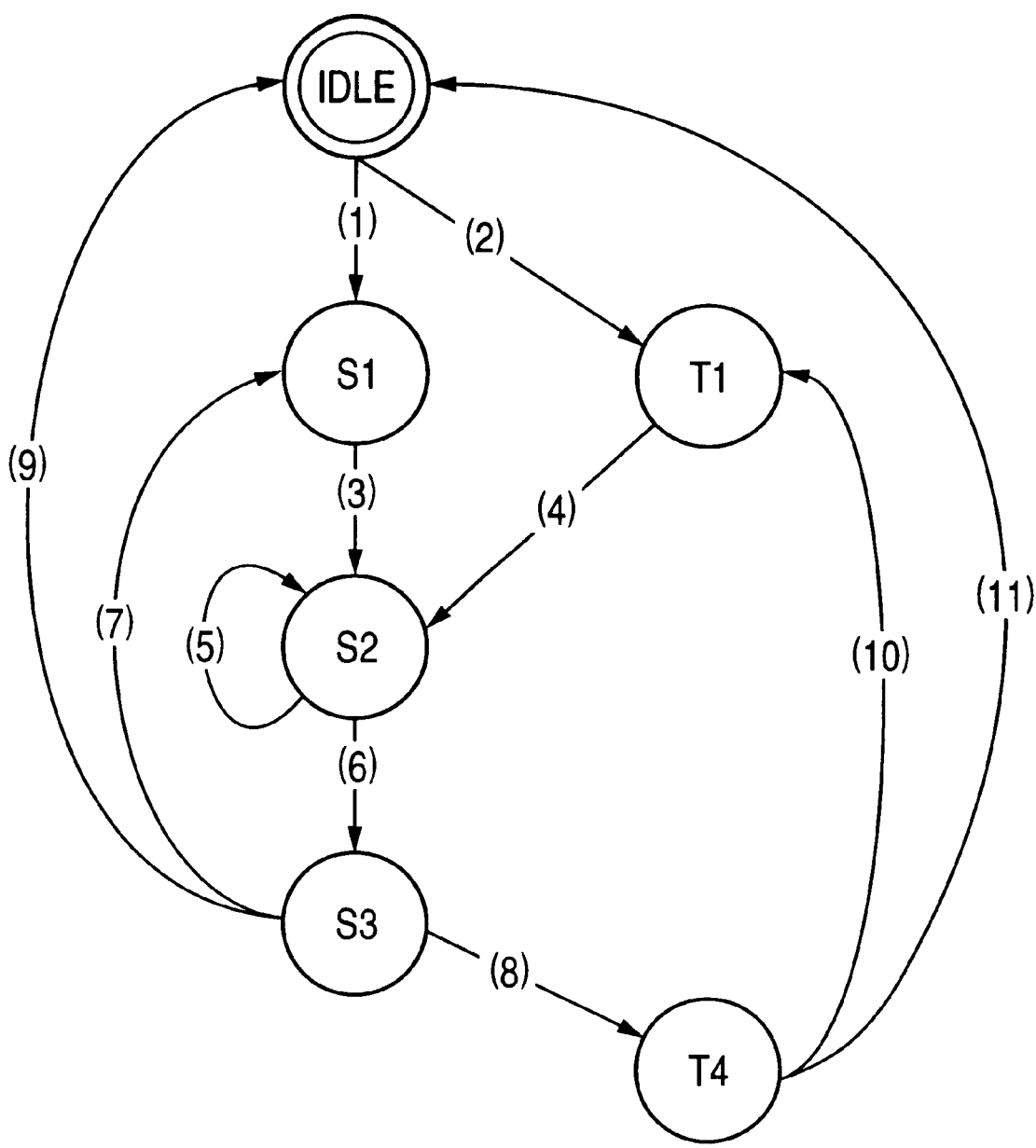
FIG. 14 is a diagram showing state transitions representing control executed by the control unit.

The control unit 131 generates sel0, sel1, state_valid and out_valid control signals in accordance with the states of the FILT, first_line, end_line, reset and in_valid input signals. FIG. 13 is a block diagram showing a typical configuration of the control unit 131. The control unit 131 executes state-transition control in accordance with a state-transition diagram shown in FIG. 14. As shown in FIG. 14, the control unit 131 can be in an Idle, S1, S2, S3, T1 or T2 state. FIG. 15 is a table individually describing conditions for transition to the Idle, S1, S2, S3, T1 and T2 states controlled by the control unit and the states of the sel0, sel1, state_valid and out_valid control signals in each of the state transitions. With the Reset signal set at a logic value of 1, transition to the Idle state from any other state occurs. It should be noted that, in FIG. 15, the symbol & represents logical multiplication.

A next-state detection logic circuit 140 employed in the control unit 131 shown in FIG. 13 determines a state to transit next in accordance with a present state held at a latch 141 and a transition condition based on the FILT, first_line, end_line, reset and in_valid input signals. A decoder 142 decodes data of the present state held at a latch 141 and the states of the FILT, first_line, end_line, reset and in_valid input signals, generating the sel0, sel1, state_valid and out_valid control signals.

Figure 16:
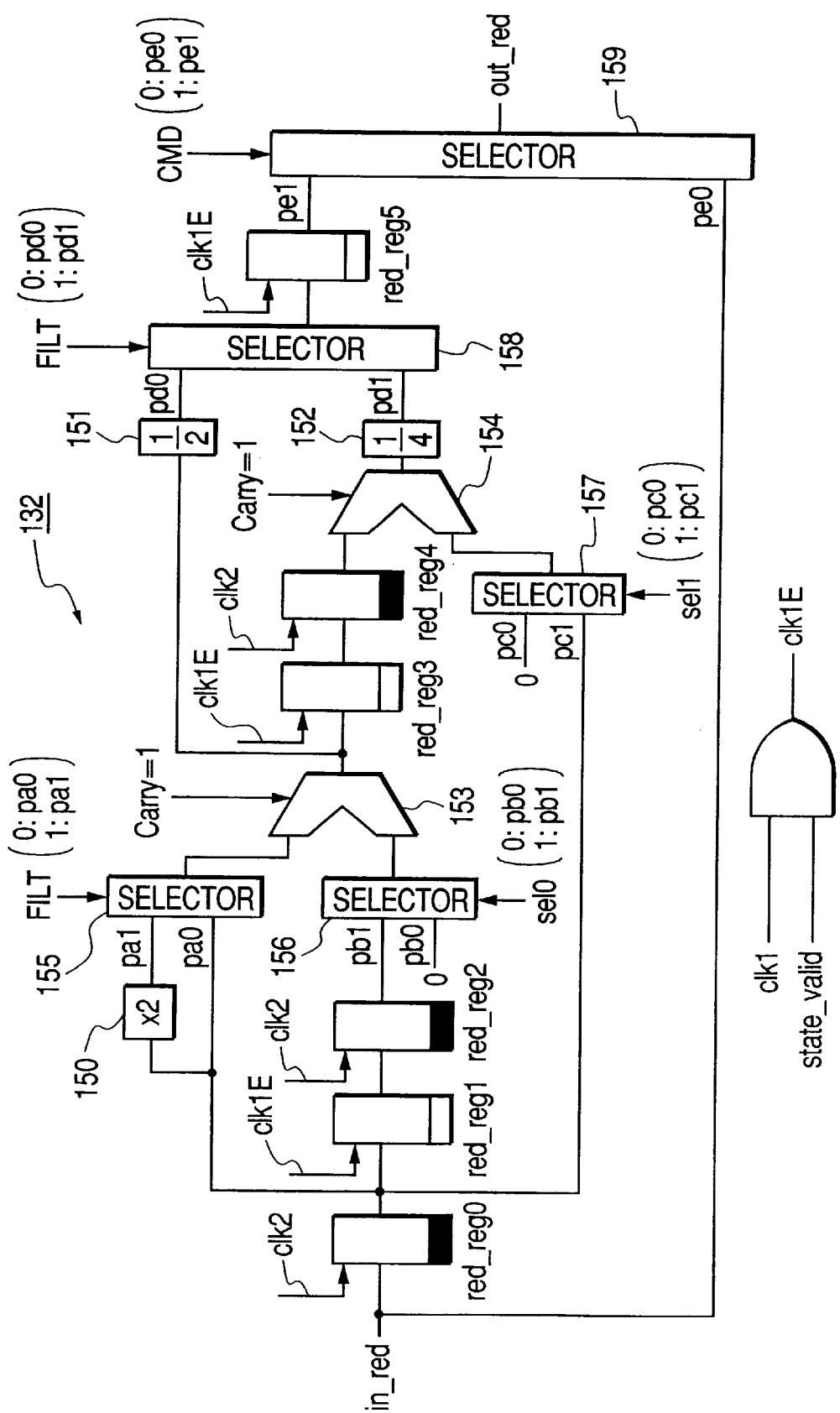
FIG. 16 is a block diagram showing a typical configuration of a processing unit included in the blend module.

FIG. 16 is a block diagram showing a typical configuration of the processing unit 132. The figure shows only a circuit configuration for the in_red pixel data as a representative example. Circuit configurations for the in-green and in_blue pixel data are entirely the same as that shown in FIG. 16. In the figure, notations red_reg0, red_reg2 and red_reg4 each denote a latch circuit operating synchronously with a clock signal clk2 whereas notations red_reg1, red_reg3 and red_reg5 each denote a latch circuit operating synchronously with a clock signal clk1E. The clock signal clk1E is a signal obtained as a logical product of a clock signal clk1E and the control signal state_valid. The clock signals clk1 and clk2 are generated by the clock-pulse generator 115.

In the processing unit 132 shown in FIG. 16, a 2-time (X 2) circuit 150 multiplies the pixel data Ci,j subjected to the 3-line weighted averaging described above by 2 by shifting the pixel data Ci,j by 1 bit to the left. A 1/2 circuit 151, that is, a circuit for shifting data supplied thereto in the less-significant-bit direction by 1 bit, implements the division in the 2-line weighted averaging described earlier. On the other hand, a 1/4 circuit 152, that is, a circuit for shifting data supplied thereto in the less-significant-bit direction by 2 bits, implements the division in the 3-line weighted averaging. Addition circuits 153 and 154 each add pieces of data supplied thereto by inputting a carry of 1 in order to let the 1/2 circuit 151 and the 1/4 circuit 152 produce a rounded quotient as a result of division. Selectors 155 and 158 each select a data path in the 2-line or 3-line weighted averaging in accordance with the FILT input signal. To be more specific, a value of 1 conveyed by the FILT input signal indicates the 3-line weighted processing. In this case, the selector 155 selects a data path pa1 and the selector 158 selects a data path pd1. On the contrary, a value of 0 conveyed by the FILT input signal indicates the 2-line weighted processing. In this case, the selector 155 selects a data path pa0 and the selector 158 selects a data path pd0. On the other hand, selectors 156 and 157 each select a data path in accordance with the sel0 and sel1 control signals respectively. The sel0 or sel1 control signal indicates whether the line currently undergoing the weighted averaging is the first or last line respectively. More specifically, a value of 0 conveyed by the sel0 control line indicates the first line of the blend processing. In this case, the selector 156 selects a data path pb0. Otherwise, a data path pb1 is selected. On the other hand, a value of 0 conveyed by the sel1 control line indicates the last line of the blend processing. In this case, the selector 157 selects a data path pc0. Otherwise, a data path pc1 is selected. A selector 159 selects a data path pe1 while the blend processing is being carried out, as evidenced by a value of 1 conveyed by the CMD input signal, or a data path pe0 when the blend processing is not being carried out, as evidenced by a value of 0 conveyed by the CMD input signal.

Next, the operation of the processing unit 132 shown in FIG. 16 will be explained. In order to make the explanation easy to understand, the operation is exemplified by the 2-line weighted averaging and the 3-line weighted averaging carried out on pieces of pixel data a to g arranged on rows in the vertical direction.

Figure 17:
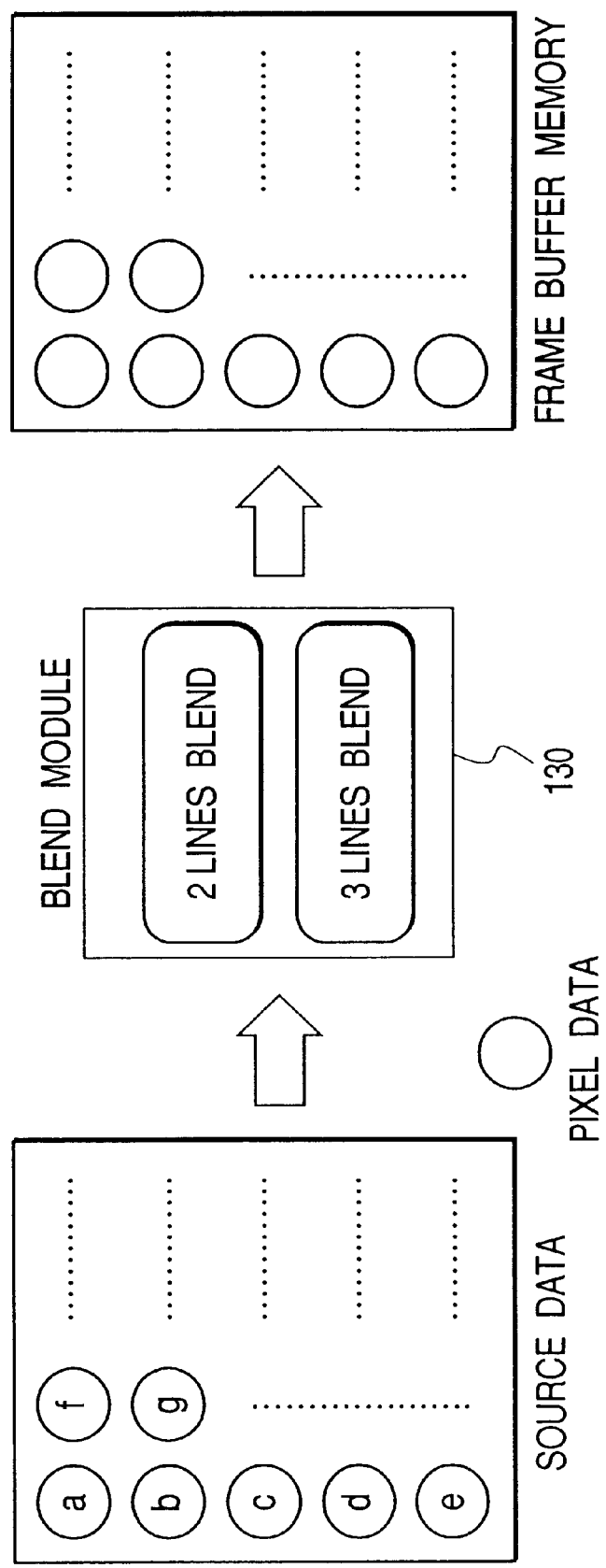
FIG. 17 is an explanatory diagram used for describing a typical relation among source data, a blend module and a frame buffer.
Figure 18:
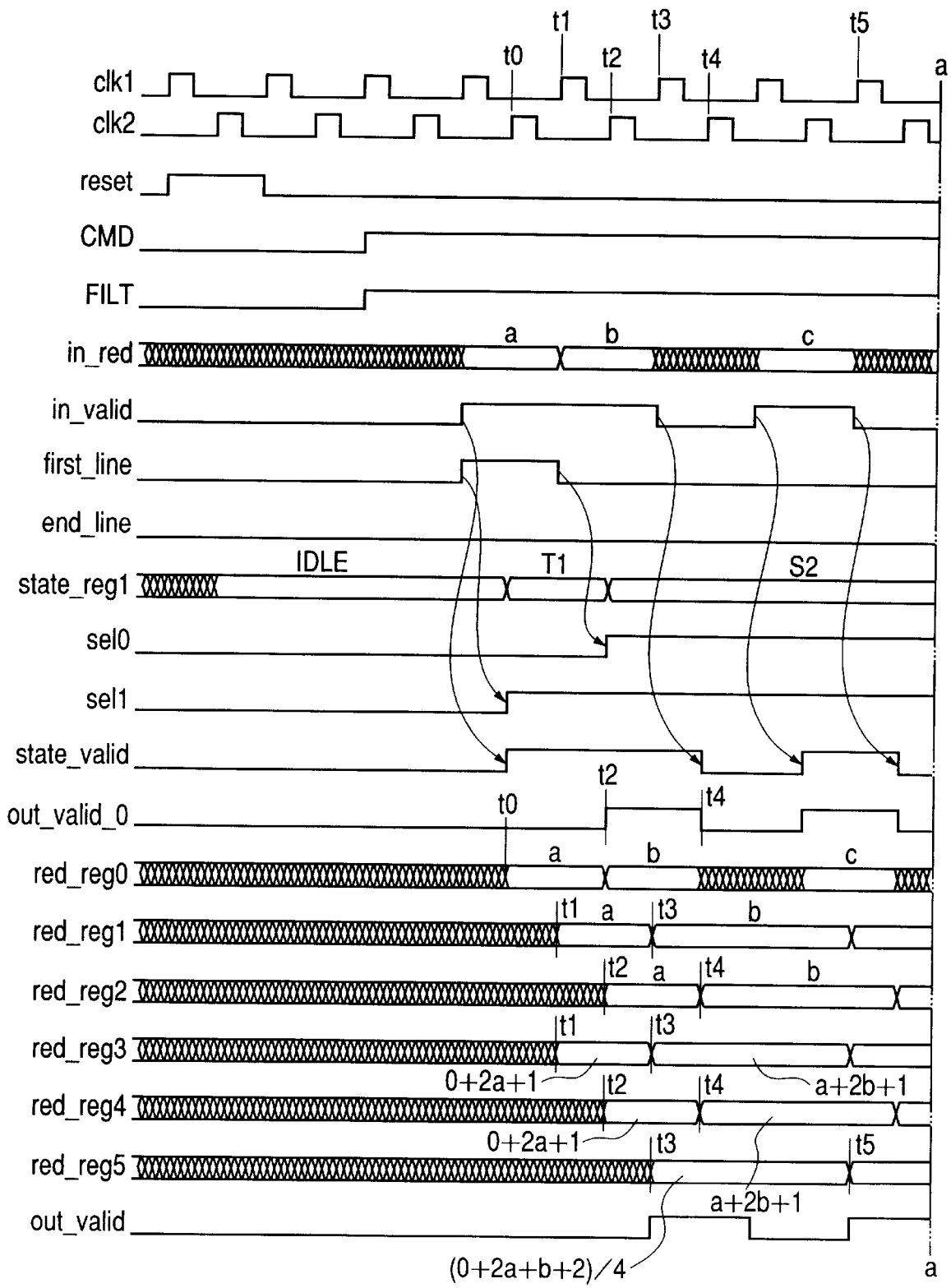
FIG. 18 is a timing chart of typical 3-line blend processing for the source data shown in FIG. 17.
Figure 19:
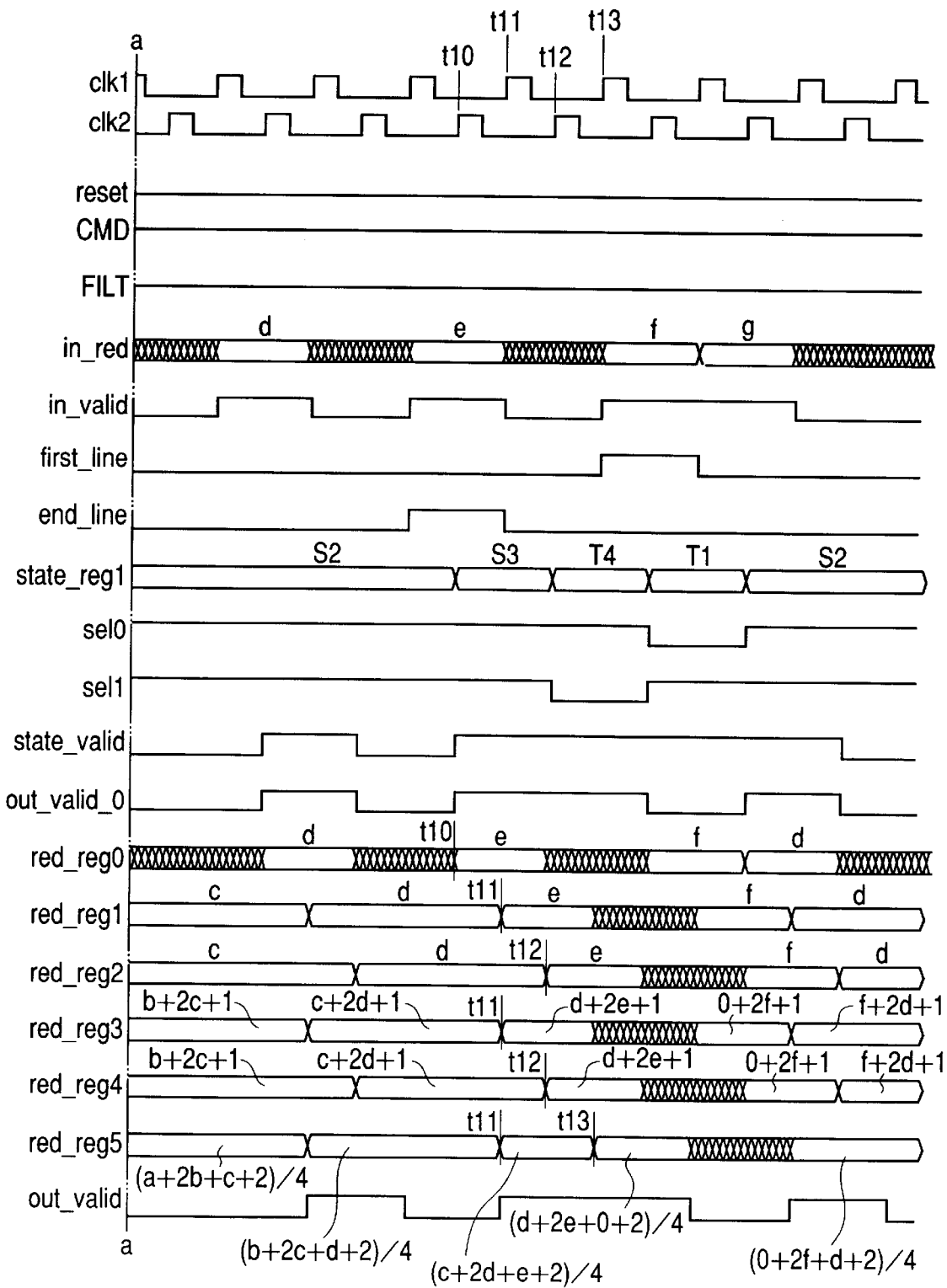
FIG. 19 is a continuation of the timing chart shown in FIG. 18 starting at a point of time indicated by a line a—a.

FIG. 18 is a timing chart of the typical 3-line blend processing carried out by the processing unit 132 shown in FIG. 16 for the source data shown in FIG. 17 and FIG. 19 is a continuation of the timing chart shown in FIG. 18 starting at a point of time indicated by a line a—a.

When the command control unit 120 decodes the FRECTQ command with the attribute information FILT thereof set to a value of 1 to request 3-line weighted averaging, first of all, the CMD input signal is set at a high logic level or a logic value of 1 to drive the selector 159 to select the data path pe1 and the FILT input signal is set at a high logic level or a logic value of 1 to drive the selectors 155 and 158 to select the data path pa1 and pd1, respectively. In this state, the blend module 130 is made capable of carrying out blend processing to find a 3-line weighted average.

The pieces of in_red pixel data a to g are input sequentially one after another along with the in_valid input signal which is set to a high logic level or a logic value of 1 to indicate that pixel data is valid. Since the pixel data a is data on the first line (row), the first_line input signal is set at a high logic level or a logic value of 1 and the sel1 control signal is also set at a high logic level or a logic value of 1 to indicate that the line is not the last line at a point of time t0 synchronously with the operation to supply the pixel data a. Thereafter, at a point of time t2, the sel0 control line is changed from a low logic level or a logic value of 0 to indicate that the line is the first line to a high logic level or a logic value of 1 to indicate that the line is not the first line any more. The pixel data a latched in the red_reg0 latch circuit at the point of time t0 is multiplied by 2 by the 2-time circuit 150 at a point of time t1. A doubled value of pixel data a output by the 2-time circuit is supplied to the addition circuit 153 by way of the selector 155 to be added to a value of 0 selected by the selector 156 as the data path pb0 and a carry of 1. The sum "0+2a+1" output by the addition circuit 153 is latched into the red_reg3 latch circuit at the point of time t1 and the red_reg4 latch circuit at the point of time t2.

On the other hand, also at the point of time t2, the pixel data b is latched into the red_reg0 latch circuit at the first stage and is supplied to the addition circuit 154 by way of the selector 157. The addition circuit 154 adds the pixel data b to the sum "0+2a+1" latched in the red_reg4 latch circuit and a carry of 1 to produce a final sum of "0+2a+b+2" which is supplied to the 1/4 circuit 152 for shifting the final sum in the less-significant-bit direction by 2 bits. The 1/4 circuit 152 produces a 3-line weighted average of (0+2a+b+2)/4 for the pixel data a. The 3-line weighted average of (0+2a+b+2)/4 is latched in the red_reg5 latch circuit at a point of time t3.

As for pixel data on the second and subsequent lines (rows), pixel data on the immediately preceding line is available in the red_reg2 latched register which is selected by the selector 156 as the dat path pb1. Consider for example the pixel data b on the second line. At the point of time t3, the doubled value of the pixel data b is added by the addition circuit 153 to a carry of 1 and the pixel data a on the immediately preceding first line which was latched into the red_reg2 latched register at the point of time t2 to be used as an operand of the addition. The result of the addition "a+2b+1" is latched into the red_reg3 latch circuit at the point of time t3.

In the case of the 3-line weighted averaging of the pixel data e on the last line or the last row, data of the next line which does not exist is not added. Thus, the addition circuit 154 adds a value of 0 selected by the selector 157 as the data path pc0 in place of the data path pc1 normally supplying the pixel data of the next line. That is, when the pixel data e on the last line is latched into the latch circuit red_reg0 at a point of time t10, the pixel data d of the immediately preceding line is latched into the red_reg2. The pixel data e is supplied to the addition circuit 153 by way of the 2-time circuit 150 and the selector 155. The addition circuit 153 computes a sum of "d+2e+1" which is latched into the red_reg3 at a point of time t11 and the red_reg4 at a point of time t12. Then, the addition circuit 154 adds the sum of "d+2e+1" latched in the red_reg4 latch circuit to the value of 0 output by the selector 157 and a carry of 1 to produce a final sum of "d+2e+2" which is supplied to the 1/4 circuit 152 for generating a 3-line weighted average of (d+2e+2)/4 for the pixel data e. The 3-line weighted average of (d+2e+2)/4 is latched into the latch circuit red_reg5 at a point of time t13. The weighted averaging for the pieces of pixel data a to g on the first column is repeated for pieces of pixel data on the second column starting with the pixel data f on the first row or the first line.

Figure 20:
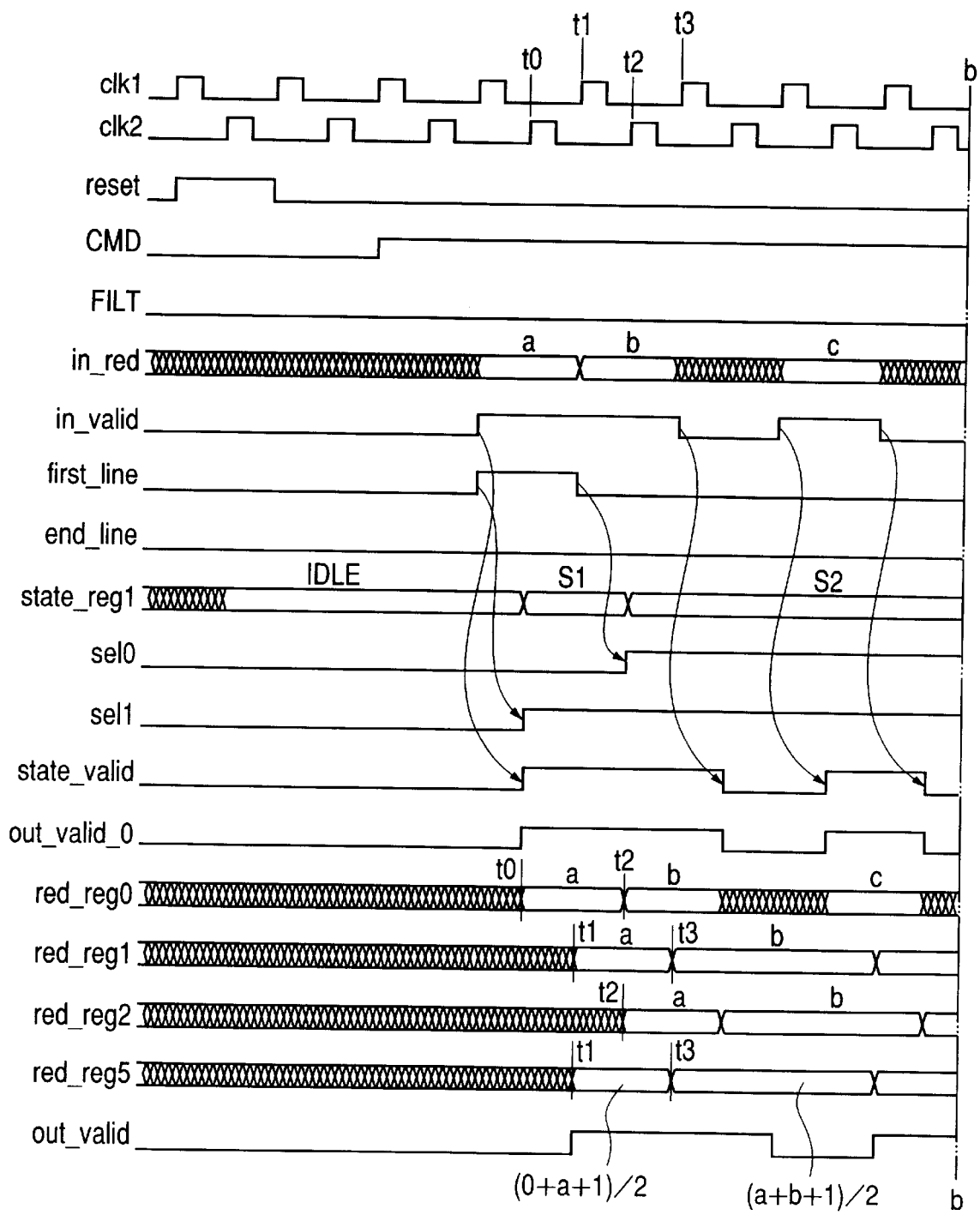
FIG. 20 is a timing chart of typical 2-line blend processing for the source data shown in FIG. 17.
Figure 21:
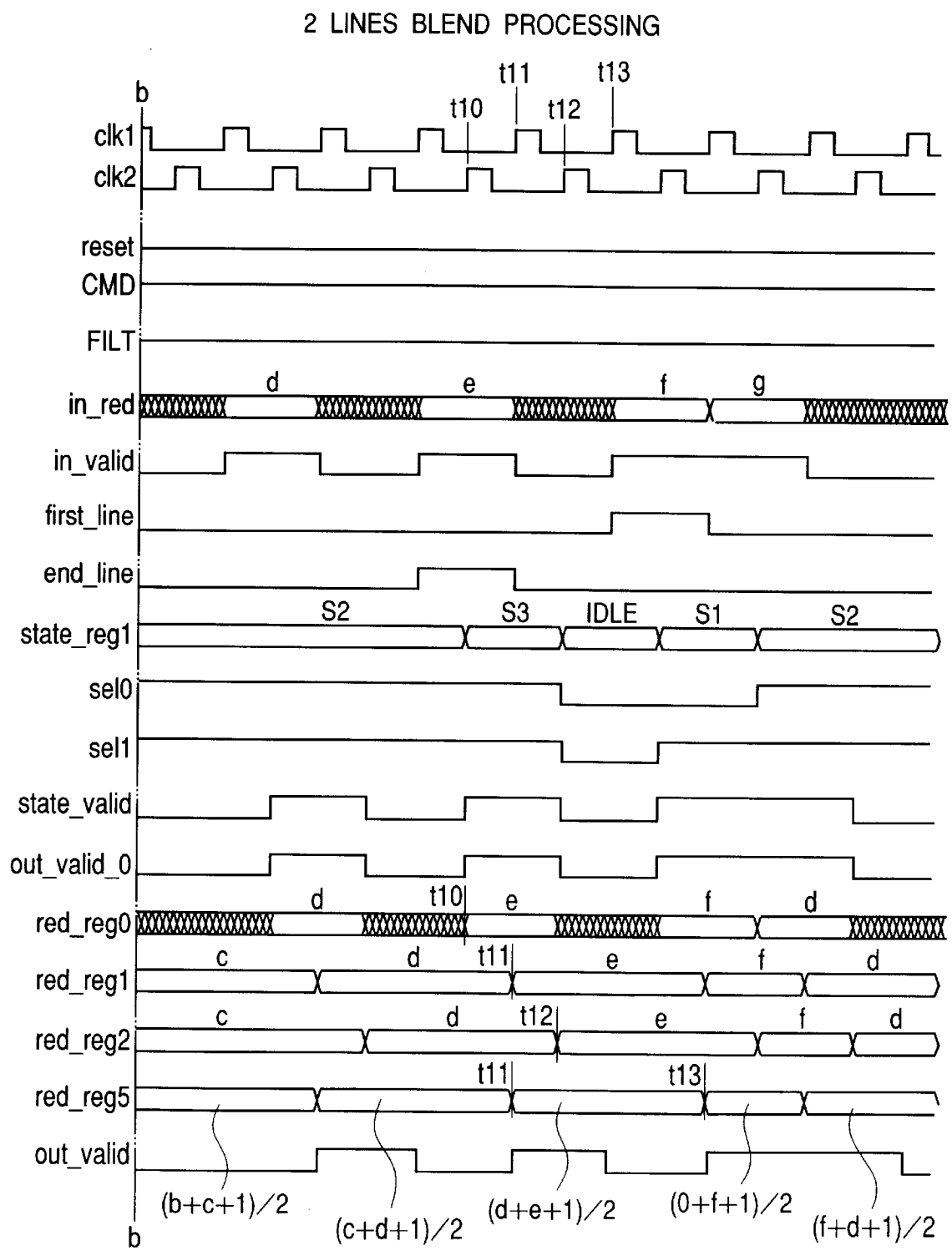
FIG. 21 is a continuation of the timing chart shown in FIG. 20 starting at a point of time indicated by a line b—b.

FIG. 20 is a timing chart of typical 2-line blend processing carried out by the processing unit shown in FIG. 16 for the source data shown in FIG. 17 and FIG. 21 is a continuation of the timing chart shown in FIG. 20 starting at a point of time indicated by a line b—b.

When the command control unit 120 decodes the FRECTQ command with the attribute information FILT thereof set to a value of 0 to request 2-line weighted averaging, first of all, the CMD input signal is set at a high logic level or a logic value of 1 to drive the selector 159 to select the data path pe1 and the FILT input signal is set at a low logic level or a logic value of 0 to drive the selectors 155 and 158 to select the data path pa0 and pd0 respectively. In this state, the blend module 130 is made capable of carrying out blend processing to find a 2-line weighted average.

The pieces of in_red pixel data a to g are input sequentially one after another along with the in_valid input signal which is set to a high logic level or a logic value of 1 to indicate that pixel data is valid. Since the pixel data a is data on the first line, the first_line input signal is set at a high logic level or a logic value of 1 and the sel1 control signal is also set at a high logic level or a logic value of 1 to indicate that the line is not the last line at a point of time t0 synchronously with the operation to supply the pixel data a. Thereafter, at a point of time t2, the sel0 control line is changed from a low logic level or a logic value of 0 to indicate that the line is the first line to a high logic level or a logic value of 1 to indicate that the line is not the first line any more. The pixel data a latched in the red_reg0 latch circuit at the point of time t0 is supplied to the addition circuit 153 by way of the selector 155 to be added to a value of 0 selected by the selector 156 as the data path pb0 and a carry of 1. The sum "0+a+1" output by the addition circuit 153 is supplied to the 1/2 circuit 151 for shifting the sum in the less-significant-bit-direction by 1 bit. The 1/2 circuit 151 produces a 2-line weighted average of (0+a+1)/2 for the pixel data a. The 2-line weighted average of (0+a+1)/2 is latched in the red_reg5 latch circuit at a point of time t1.

As for pixel data on the second and subsequent lines, pixel data on the immediately preceding line is available in the red_reg2 latched register which is selected by the selector 156 as the data path pb1. Consider for example the pixel data b on the second line. At the point of time t3, the pixel data b is added by the addition circuit 153 to a carry of 1 and the pixel data a on the immediately preceding first line, which was latched into the red_reg2 latched register at the point of time t2 is to be used as an operand of the addition. The result of the addition is "a+b+1". The sum "a+b+1" output by the addition circuit 153 is supplied to the 1/2 circuit 151 for shifting the sum in the less-significant-bit direction by 1 bit. The 1/2 circuit 151 produces a 2-line weighted average of (a+b+1)/2 for the pixel data b. The 2-line weighted average of (a+b+1)/2 is latched in the red_reg5 latch circuit at a point of time t3.

In the 2-line weighted averaging for the pixel data e on the last line or the last row, pixel data on the second and subsequent lines is not supplied to the blend module. That is, when the pixel data e on the last line is latched into the latch circuit red_reg0 at a point of time t10, the pixel data d of the immediately preceding line is latched into the red_reg2. The pixel data d and the pixel data e are supplied to the addition circuit 153 by way of the selectors 156 and 155 respectively. The addition circuit 153 computes a sum of "d+e+1". The sum "d+e+1" output by the addition circuit 153 is supplied to the 1/2 circuit 151 for shifting the sum in the less-significant-bit direction by 1 bit. The 1/2 circuit 151 produces a 2-line weighted average of (d+e+1)/2 for the pixel data e. The 2-line weighted average of (d+e+1)/2 is latched in the red_reg5 latch circuit at a point of time t13 by way of the selector 158. The weighted averaging for the pieces of pixel data a to g on the first column is repeated for pieces of pixel data on the second column starting with the pixel data f on the first row or the first line.

Pixel data is supplied to the blend module 130 as source data from the unified memory unit 4 by way of the work buffer 101B or the source buffer 101C shown in FIG. 4. The location and the size of an area in which the source data is stored are specified by the arguments TXS, TYS, TDX and TDY of the blend-processing command as shown in FIG. 9.

Image data obtained as a result of the weighted averaging carried out by the blend module 130 is stored back by the rendering-address control unit 1223 in the frame-buffer area of the unified memory unit 4 by way of the write buffer 101D. The image data is stored back in the frame-buffer area at destination addresses specified by the arguments DX1, DY1, DX2, DY2, DX3, DY3, DX4 and DY4 as well as the attribute information CLIP as will be described below through examples. For reference, refer to FIG. 9.

Figure 22:
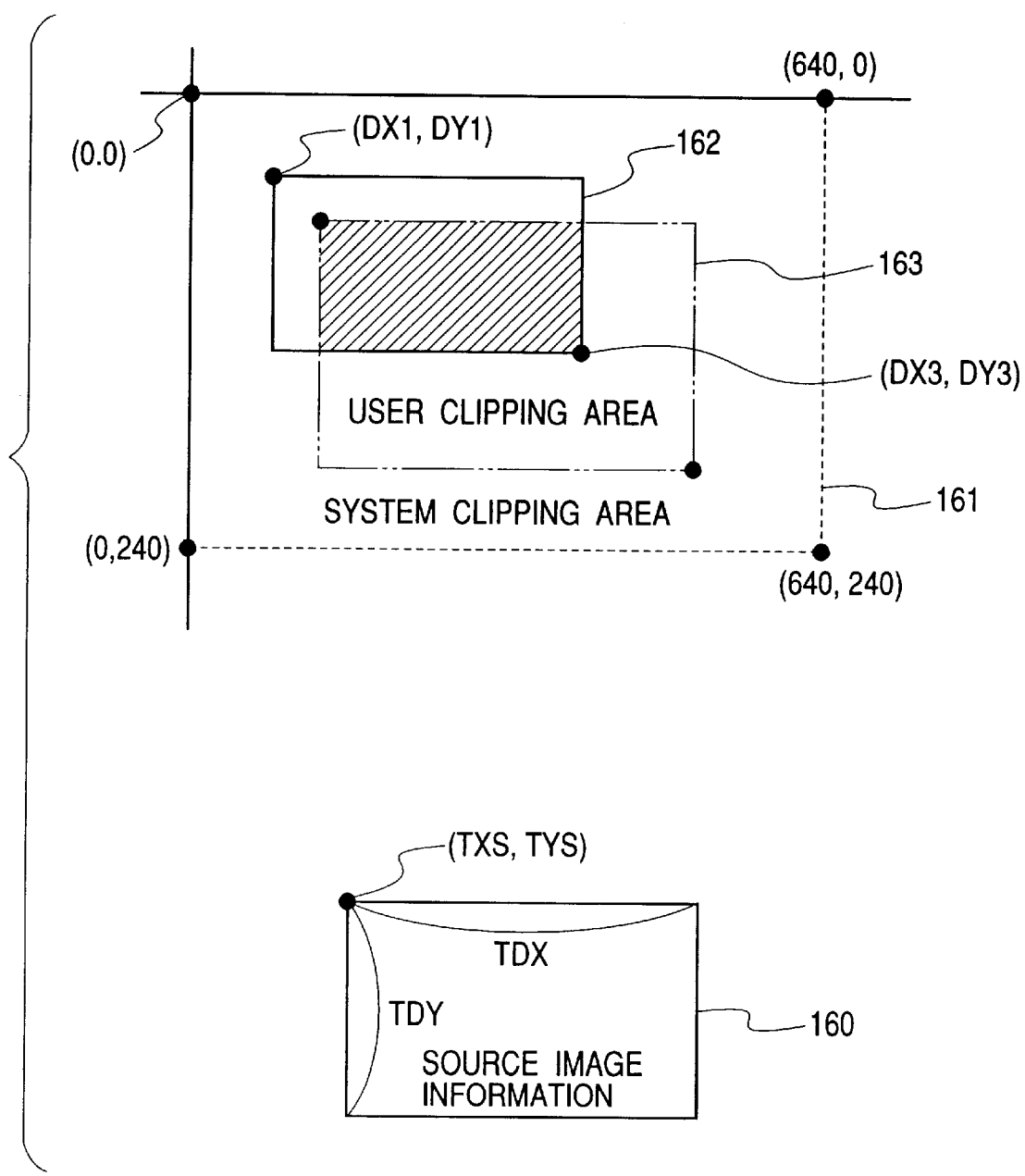
FIG. 22 is an explanatory diagram used for describing how to treat attribute information CLIP in blend processing.

For example, assume that a user clipping area 163 is specified in a system clipping area 161 which is specified in the rendering coordinate system as shown in FIG. 22. The system and user clipping areas 161 and 163 are specified by using the system and user-clipping-area specifying registers 1221A and 1221B respectively. In this case, if the CLIP attribute information of the blend-processing command is set at 0, the user clipping area 163 is considered to be ineffective in the execution of the blend-processing command and image information obtained as a result of weighted averaging of source image information 160 is stored back in a write area 162 at destination addresses specified by the arguments DX1, DY1, DX2, DY2, DX3, DY3, DX4 and DY4.

If the CLIP attribute information of the blend-processing command is set at 1, on the other hand, the user clipping area 163 is considered to be effective in the execution of the blend-processing command. In this case, image information obtained as a result of weighted averaging of source image information 160 is stored back in an area common to the write area 162 at destination addresses specified by the arguments DX1, DY1, DX2, DY2, DX3, DY3, DX4 and DY4 and the user clipping area 163, that is, a hatched area.

As described above, read and write addresses in read/modify/write processing carried out by execution of a blend-processing command can be specified arbitrarily by using command arguments, allowing the user to specify a write area along with a user clipping area. It is thus possible to obtain freedom to arbitrarily determine an area in the display area for carrying out blend processing. For example, in the case of a computer image overlaid over a natural picture, it is possible to carry out blend processing only on the computer image. That is, it is possible to carry out blend processing only on a required portion of image information, allowing wasteful processing to be eliminated. As a result, the blend-processing time can be shortened and yet the quality of the picture can be improved.

When image data which completes blend processing and is stored in the frame-buffer area is displayed by adopting the interlace scanning technique, image data of one frame is divided into even fields and odd fields. As will be described later, the even and odd fields are displayed on screens independent from each other. Since the displayed data is subject to blend processing, however, undesired flickering is not generated.

In the graphic processor 1 described above, the rendering unit 100 for executing rendering control carries out weighted averaging on pieces of pixel data located adjacent to each other. It is thus possible to eliminate the difference in image information between adjacent scanning lines, which is big in some cases. In this case, the graphic processor 1 reads out pieces of pixel data from the unified memory unit 4 sequentially in a direction perpendicular to the scanning direction and computes a weighted average of the pieces of data. It is therefore unnecessary to newly install a storage means, such as a line buffer, in the display unit 102 and, particularly, in the rendering unit 100. As a result, the cost of the graphic processor can be reduced.

The blend-processing command includes the FILT attribute information used for arbitrarily specifying 3-line weighted processing or 2-line weighted processing. This is because it is quite within the bounds of possibility that the image will blur adversely as a result of excessive weighted averaging. It is thus necessary to select a degree to which the weighted averaging is to be carried out on source data subjected to the blend processing in accordance with characteristics of the source data by setting a proper value in the FILT attribute information. By doing so, a flicker-free picture with a high quality can be obtained.

In addition, not only does the blend-processing command allow read and write addresses which have been accessed in a read/modify/write operation to be specified arbitrarily, but the command also has the CLIP attribute information for arbitrarily indicating whether or not a limitation of a rendering range by the user clipping area is effective. It is thus possible to obtain freedom to arbitrarily determine an area in the display area for carrying out blend processing. For example, in the case of a computer image overlaid over a natural picture, it is possible to carry out blend processing only on the computer image. That is, it is possible to carry out weighted averaging implemented as a read/modify/write operation only on a required portion of source image information and to arbitrarily specify write addresses at which the modified image data is to be stored. Furthermore, it is possible to select an overlay only in a clipping area. As a result, flickering can be prevented by blend processing for image data at any arbitrary location in the frame-buffer area, allowing excellent operability as desired by the user to be implemented.

By applying the graphic processor 1 to a data processing system, such as an Internet television or a navigation system, the cost of the data processing system can be reduced.

It should be noted that the scope of the present invention is not limited to the embodiment presented in concrete terms as described earlier. It is needless to say that a variety of changes can be made to the embodiment in a range not departing from the gist of the present invention.

Figures 23, 24:
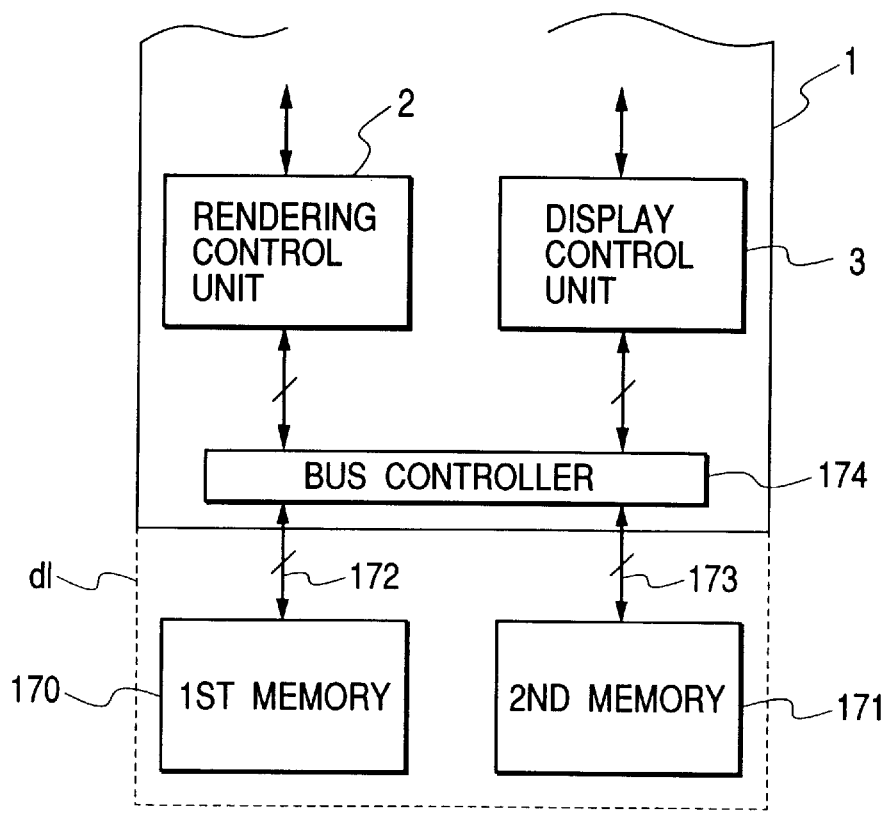
FIG. 23 is a block diagram showing an implementation for solving a bus bottleneck of data exchanges with an external memory.
FIG. 24 is an explanatory diagram used for describing a typical state of memory access operations of a rendering control unit and a display control unit in which the memory configuration of FIG. 23 is adopted.

For example, in the data processing system described above, a unified memory 4 is employed. It is worth noting, however, that the unified memory unit 4 can be typically divided into a first memory unit 170 and a second memory unit 171 as a shown in FIG. 23. In this case, both the rendering control means 2 and the display control means 3 are capable of making accesses to both the memory units 170 and 171 concurrently through dedicated buses 172 and 173, respectively, with a width of 32, 64 or 128 bits and a bus controller 174. FIG. 24 is an explanatory diagram used for describing operations of the rendering control means 2 and the display control means 3 to alternately make accesses to the memory units 170 and 171 to solve the bus bottleneck problem and, hence, to increase the efficiencies of the rendering control and the display control. It should be noted that the rendering control circuit 2, the display control circuit 3 and the bus controller 174, as well as the first memory 170, the second memory 171, the bus 172 and the bus 173 enclosed by a dashed line in FIG. 23 can be implemented by circuits all built on a single semiconductor substrate to form a single-chip graphic processor 1, allowing the cost to be reduced and the performance to be improved.

As described above, the present invention is mainly applied to an Internet television and a navigation system in a field of application serving as the background of the invention. It should be noted that the scope of the above present invention is not limited to an Internet television and a navigation system. For example, the present invention can also be applied to a wide range of data processing systems including personal computers and game machines.

Representative effects of the present invention disclosed in this application are described as follows.

A rendering control means carries out weighted averaging on pieces of pixel data located adjacent to each other. It is thus possible to eliminate any difference in image information between adjacent scanning lines, which is big in some cases. In this case, the rendering control means reads out pieces of pixel data from a memory sequentially in a direction perpendicular to the scanning direction and computes a weighted average of the pieces of data. It is therefore unnecessary to newly install a storage means, such as a line buffer, in a display control means and, particularly, in the rendering control means. As a result, it is possible to eliminate the difference in image information between adjacent scanning lines, which is big in some cases, without providing line buffers. Thus, even when image data subjected to blend processing is displayed by adopting the interlace scanning technique, undesired flickering is not generated.

In addition, source specifying information and destination specifying information of a blend processing command can be specified arbitrarily. It is thus possible to obtain freedom to arbitrarily determine a write area in the display area for carrying out blend processing. Therefore, it is possible to carry out blend processing only on a required portion of image information, allowing wasteful processing to be eliminated. As a result, the blend-processing time can be shortened and yet the quality of the picture can be improved.

Furthermore, it is quite within the bounds of possibility that the image will blur adversely as a result of excessive weighted averaging. By virtue of the present invention, however, it is possible to select a degree to which the weighted averaging is to be carried out on source data subjected to the blend processing in accordance with characteristics of the source data. By doing so, a flicker free picture with a high quality can be obtained.

Furthermore, the blend-processing command can be further provided with attribute information for specifying that image data subjected to weighted processing be stored only in an area that is included in a clipping area and is specified by the destination specifying information. That is, a clipping area can also be used in conjunction with the destination specifying information. As a result, the operability of the blend processing can be improved, allowing the graphic processor to be used more in a way desired by the user.

What is claimed is:

1. A graphic processor comprising:
    a rendering control circuit controlling an operation to store pixel data of source image information onto a memory in accordance with a result of decoding a plurality of commands which include a blend processing command which causes a blend processing to be carried out in accordance with area information; and
    a display control circuit controlling an operation to read out pixel data from said memory synchronously with display scanning timing in a scanning direction,
    wherein pieces of pixel data of said source image information having an area included in said area information, are arranged on said memory to form a pixel-data matrix corresponding to a pixel matrix with columns of said pixel-data matrix being oriented perpendicularly to said scanning direction, and
    wherein said rendering control circuit is capable of carrying out said blend processing to correct said source image information by calculating a weighted average of pieces of pixel data located adjacent to each other which are laid out on the same column of said pixel-data matrix perpendicular to said scanning direction.

2. A graphic processor comprising:
    a rendering control circuit controlling an operation to store pixel data of source image information onto a memory in accordance with a result of decoding a plurality of commands; and
    a display control circuit controlling an operation to read out pixel data from said memory synchronously with display scanning timing in a scanning direction,
    wherein said rendering control circuit is capable of executing a blend processing command which causes a blend processing to be performed in accordance with area information, and
    wherein said blend processing command includes:
    source specifying information specifying a location of source image information in which pixel-data is arranged corresponding to a pixel matrix,
    command information requesting an operation to calculate a weighted average of pieces of pixel data located adjacent to each other which are laid out on the same column of said pixel-data matrix perpendicular to said scanning direction, and
    destination specifying information specifying a location at which said weighted average of pixel data is to be stored.

3. A graphic processor according to claim 2, wherein said blend-processing command further includes:
    first attribute information specifying whether to calculate a weighted average of a particular piece of pixel data and pieces of pixel data which are laid out on the same column of said pixel-data matrix as said particular piece of pixel data perpendicular to said scanning direction and on rows of said pixel-data matrix immediate preceding and succeeding a row of said particular piece of pixel data, or to calculate a weighted average of a particular piece of pixel data, and a piece of pixel data which is laid out on the same column as said particular piece of pixel data perpendicular to said scanning direction and on a row immediately preceding or succeeding a row of said particular piece of pixel data.

4. A graphic processor according to claim 3, wherein said blend-processing command further includes:
    second attribute information specifying that said weighted average of pixel data be stored at a location included in both an area specified by said destination specifying information and a clipping area.

5. A graphic processor according to claim 3, wherein said blend-processing command further includes:
    second attribute information specifying whether to calculate a weighted average of particular piece of pixel data and pieces of pixel data which are laid out on the same column of said pixel-data matrix as said particular piece of pixel data perpendicular to said scanning direction on a rows of said pixel-data matrix immediately preceding and succeeding a row of said particular piece of pixel data, or to calculate a weighted average of a particular piece of a pixel data, and a piece of pixel data which is laid out on the dame column as said particular piece of pixel data perpendicular to said scanning direction and on a row immediately preceding or succeeding a row of said particular piece of pixel data.

6. A graphic processor comprising:
    a rendering control circuit controlling an operation to store pixel data of source image information onto a memory in accordance with a result of decoding a command;
    a display control circuit controlling an operation to read out pixel data from said memory synchronously with display scanning timing in a scanning direction, wherein said rendering control circuit being capable of executing a blend-processing command having:

source specifying information specifying a location of source image information in which pixel-data is arranged corresponding to a pixel matrix, command information requesting an operation to calculate a weighted average of pieces of pixel data which are laid out on the same column of said pixel-data matrix perpendicular to said scanning direction and on rows of the pixel-data matrix located adjacent to each other, and destination specifying information specifying a location at which said weighted average of pixel data is to be stored, and herein said blend-processing command further has first attribute information specifying whether to calculate a weighted average of a particular piece of pixel data and pieces of pixel data which are laid out on the same column of said pixel-data matrix as said particular piece of pixel data perpendicular to said scanning direction and on rows of said pixel-data matrix immediately preceding and succeeding a row of said particular piece of pixel data, or to calculate a weighted average of a particular piece of pixel data and a piece of pixel data which is laid out on the same column as said particular piece of pixel data perpendicular to said scanning direction and on a row immediately preceding or succeeding a row of said particular piece of pixel data.

7. A graphic processor according to claim 6, wherein said blend-processing command further has second attribute information specifying that said weighted average of pixel data be stored at a location included in both an area specified by said destination specifying information and a clipping area.

8. A graphic processor comprising:

a rendering control circuit controlling an operation to store pixel data of source image information onto a memory in accordance with a result of decoding a command; and a display control circuit controlling an operation to read out pixel data from said memory synchronously with display scanning timing in a scanning direction, wherein said rendering control circuit being capable of executing a blend-processing command which includes:

source specifying information specifying a location of source image information in which pixel-data is arranged corresponding to a pixel matrix, command information requesting an operation to calculating a weighted average of pieces of pixel data located adjacent to each other which are laid out on the same column of said pixel-data matrix perpendicular to said scanning direction, and destination specifying information specifying a location at which said weighted average of pixel data is to be stored, and wherein said blend-processing command further includes attributes information specifying that said weighted average of pixel data are stored at a location included in both an area specified by said destination specifying information and a clipping area.

* * * * *